(12) United States Patent
Kitamura et al.

(10) Patent No.: US 9,207,069 B2
(45) Date of Patent: Dec. 8, 2015

(54) DEVICE FOR GENERATING A THREE-DIMENSIONAL MODEL BASED ON POINT CLOUD DATA

(75) Inventors: Kazuo Kitamura, Tokyo (JP); Nobuo Kochi, Tokyo (JP); Nicola D'Apuzzo, Zurich (CH)

(73) Assignee: KABUSHIKI KAISHA TOPCON, Tokyo (JP)

( * ) Notice: Subject to any disclaimer, the term of this patent is extended or adjusted under 35 U.S.C. 154(b) by 0 days.

(21) Appl. No.: 13/507,117

(22) Filed: Jun. 5, 2012

(65) Prior Publication Data
US 2012/0256916 A1    Oct. 11, 2012

Related U.S. Application Data

(63) Continuation of application No. PCT/JP2010/071188, filed on Nov. 19, 2010.

(30) Foreign Application Priority Data

Dec. 11, 2009    (JP) .................................. 2009-281883

(51) Int. Cl.
| | | |
|---|---|---|
| *G06K 9/46* | (2006.01) | |
| *G06T 17/00* | (2006.01) | |
| *G01B 11/24* | (2006.01) | |
| *G01S 17/89* | (2006.01) | |

(52) U.S. Cl.
CPC ................ *G01B 11/24* (2013.01); *G01S 17/89* (2013.01)

(58) Field of Classification Search
None
See application file for complete search history.

(56) References Cited

U.S. PATENT DOCUMENTS

| 6,330,523 B1 | 12/2001 | Kacyra et al. |
| 8,179,393 B2 * | 5/2012 | Minear et al. .................. 345/419 |

(Continued)

FOREIGN PATENT DOCUMENTS

| JP | 2004-272459 A | 9/2004 |
| JP | 2005-024370 A | 1/2005 |
| JP | 2006-085333 A | 3/2006 |

OTHER PUBLICATIONS

Towards 3D Point cloud based object maps for household environments, Radu Bogdan Rusu et al, Aug. 20, 2008 http://www.sciencedirect.com/science/article/pii/S0921889008001140 http://www.willowgarage.com/papers/towards-3d-point-cloud-based-object-maps-household-environments.*

(Continued)

*Primary Examiner* — Stephen R Koziol
*Assistant Examiner* — Jason Pringle-Parker
(74) *Attorney, Agent, or Firm* — Brinks Gilson & Lione

(57) ABSTRACT

A point cloud data processing device extracts features of an object from point cloud data thereof and automatically generates a three-dimensional model in a short time. The device includes a non-plane removing unit for removing points of non-plane areas from the point cloud data, and a plane labeling unit for adding identical labels to points in the same planes other than the points that are removed by the non-plane removing unit so as to segment the point cloud data into planes. The device also includes a three-dimensional edge extracting unit for extracting three-dimensional edges based on at least one of lines of intersections of the segmented planes and convex lines that convexly cover the segmented planes. The device further includes a two-dimensional edge extracting unit for extracting two-dimensional edges from within the segmented planes, and an edge integrating unit for integrating the three-dimensional edges and the two-dimensional edges.

11 Claims, 21 Drawing Sheets
(9 of 21 Drawing Sheet(s) Filed in Color)

(56) References Cited

U.S. PATENT DOCUMENTS

2005/0140670 A1* 6/2005 Wu et al. .................. 345/419
2007/0291993 A1* 12/2007 Nisper et al. .............. 382/108
2010/0034426 A1* 2/2010 Takiguchi et al. .......... 382/106

OTHER PUBLICATIONS

"A new segmentation method for point cloud" H. Woo, Mar. 2001.*
International Search Report for International Application No. PCT/JP2010/071188, dated Jan. 25, 2011, 1 page.

* cited by examiner

DEVICE FOR GENERATING A THREE-DIMENSIONAL MODEL BASED ON POINT CLOUD DATA

RELATED APPLICATIONS

This application is a continuation of PCT/JP2010/071188 filed on Nov. 19, 2010, which claims priority to Japanese Application No. 2009-281883 filed on Dec. 11, 2009. The entire contents of these applications are incorporated herein by reference.

BACKGROUND OF THE INVENTION

1. Field of the Invention

The present invention relates to a point cloud data processing device, and specifically relates to a point cloud data processing device which extracts features of an object from point cloud data thereof and which automatically generates a three-dimensional model in a short time.

2. Description of the Related Art

As a method for generating a three-dimensional model from point cloud data of an object, a method of connecting adjacent points and forming polygons may be used. In this case, in order to form polygons from several tens of thousands to tens of millions of points of the point cloud data, enormous amounts of processing time are required, and this method is not useful. In view of this, the following techniques are disclosed in, for example, Japanese Unexamined Patent Application Publication (Translation of PCT Application) No. 2000-509150 and Japanese Unexamined Patent Applications Laid-open Nos. 2004-272459 and 2005-024370. In these techniques, only three-dimensional features (edges and planes) are extracted from point cloud data, and three-dimensional polylines are automatically generated.

In the invention disclosed in Japanese Unexamined Patent Application Publication (Translation of PCT Application) No. 2000-509150, a scanning laser device scans a three-dimensional object and generates point clouds. The point cloud is separated into a group of edge points and a group of non-edge points, based on changes in depths and normal lines of the scanned points. Each group is fitted to geometric original drawings, and the fitted geometric original drawings are extended and are crossed, whereby a three-dimensional model is generated.

In the invention disclosed in Japanese Unexamined Patent Application Laid-open No. 2004-272459, segments (triangular polygons) are formed from point cloud data, and edges and planes are extracted based on continuity, direction of normal line, or distance, of adjacent polygons. Then, the point cloud data of each segment is converted into a plane equation or a curve equation by the least-squares method and is grouped by planarity and curvature, whereby a three-dimensional model is generated.

In the invention disclosed in Japanese Unexamined Patent Application Laid-open No. 2005-024370, two-dimensional rectangular areas are set for three-dimensional point cloud data, and synthesized normal vectors of measured points in the rectangular areas are obtained. All of the measured points in the rectangular area are rotationally shifted so that the synthesized normal vector corresponds to a z-axis direction. Standard deviation σ of z value of each of the measured points in the rectangular area is calculated. Then, when the standard deviation σ exceeds a predetermined value, the measured point corresponding to the center point in the rectangular area is processed as noise.

SUMMARY OF THE INVENTION

In view of these circumstances, an object of the present invention is to provide a technique for extracting features of an object from point cloud data thereof and automatically generating a three-dimensional model in a short time.

In the invention according to claim 1, as originally filed, the present invention provides a point cloud data processing device including a non-plane removing unit, a plane labeling unit, a three-dimensional edge extracting unit, a two-dimensional edge extracting unit, and an edge integrating unit. The non-plane removing unit removes points of non-plane areas from point cloud data of an object. The plane labeling unit adds identical labels to points in the same planes other than the points removed by the non-plane removing unit so as to segment the point cloud data into planes. The three-dimensional edge extracting unit extracts three-dimensional edges based on at least one of lines of intersections of the segmented planes and convex lines that convexly cover the segmented planes. The two-dimensional edge extracting unit extracts two-dimensional edges from within the segmented planes. The edge integrating unit integrates the three-dimensional edges and the two-dimensional edges.

According to the invention as recited in claim 1, as original filed, features of the object are extracted from the point cloud data thereof, and a three-dimensional model is automatically generated in a short time. The features of the object consist of three-dimensional edges and two-dimensional edges. The three-dimensional edges primarily form three dimensional images, and the two-dimensional edges form figures within flat planes and curved planes (hereinafter, simply called "planes"). The three-dimensional edges are lines of intersections of the planes that differ from each other in position and direction and are outer edges of each plane. The two-dimensional edges are points and lines of which color densities suddenly change in a plane. The three-dimensional edges form contours of the object. The contours are combined lines (outlines) that form an outer shape of the object and that are necessary to visually understand the appearance of the object. Specifically, the contours are bent portions and portions of which curvatures are suddenly decreased. The contours are not only outside frame portions but also edge portions which characterize convexly protruding portions and which characterize concavely recessed portions (for example, grooved portions). According to the contours, the so-called "line figure" is obtained, and an image that enables easily understanding of the appearance of the object is displayed. Actual contours exist on boundaries between the planes and on the edge portions, but in the present invention, these portions are removed as non-plane areas from the point cloud data. Therefore, for example, the contours are obtained by calculating lines of intersections of the segmented planes and convex lines.

In the invention according to claim 2, as originally filed, according to the invention recited in claim 1, as originally filed, the point cloud data processing device may further include a normal line calculating unit. The normal line calculating unit calculates local planes having each point of the point cloud data at the center and calculates normal lines of the local planes.

According to the invention as recited in claim 2, as originally filed, the points in the same plane are extracted based on the direction of the normal line of each point of the point cloud data, whereby the points of the point cloud data are segmented into planes.

In the invention according to claim 3, as originally filed, according to the invention recited in claim 2, as originally filed, the point cloud data processing device may further include a local curvature calculating unit. The local curvature calculating unit calculates a standard deviation of three axis components of the normal lines and a square-root of sum of squares of the standard deviation and thereby calculates a local curvature.

According to the invention as recited in claim 3, as originally filed, the points of the non-plane areas are removed based on variations of the normal line (local curvature) of each point of the point cloud data.

In the invention according to claim 4, as originally filed, according to the invention recited in claim 3, as originally filed, the non-plane removing unit may remove the points of the non-plane areas based on the local curvature.

According to the invention as recited in claim 4, as originally filed, points of non-plane areas including sharp three-dimensional edges, smooth three-dimensional edges, and noise, are removed. The sharp three-dimensional edges are generated by changes of the directions of the planes, and the smooth three-dimensional edges are generated by curved planes with large local curvatures.

In the invention according to claim 5, as originally filed, according to the invention recited in claim 2, as originally filed, the non-plane removing unit may remove points of the non-plane areas based on accuracy of fitting the points to the local planes.

According to the invention as recited in claim 5, as originally filed, points of non-plane areas including noise and three-dimensional edges that are generated by occlusion are removed. The "occlusion" is a condition in which the inner portions are hidden by the front portions and cannot be seen. That is, the fitting accuracy to a local plane is, for example, an average value of distances between a local plane and each point used for calculating the local plane. The three-dimensional edges generated by the occlusion contain points of the inner portions and the front portions, in which three-dimensional positions differ greatly. Therefore, according to the fitting accuracy to the local planes, the points of the non-plane areas including noise and such three-dimensional edges are removed.

In the invention according to claim 6, as originally filed, according to the invention recited in claim 2, as originally filed, the non-plane removing unit may remove the points of the non-plane areas based on coplanarity of a target point and the adjacent point.

According to the invention as recited in claim 6, as originally filed, when a target point and the adjacent point have coplanarity, a normal line of each point and a line segment connecting the points cross each other at right angles, and an inner product thereof is zero. According to this condition, points of non-plane areas including noise and sharp three-dimensional edges generated by changes of the directions of the planes are removed.

In the invention according to claim 7, as originally filed, according to the invention recited in claim 2, as originally filed, the plane labeling unit may add identical labels to the points in the same plane based on an angular difference between the normal lines of a target point and the adjacent point.

According to the invention as recited in claim 7, as originally filed, the points of the point cloud data are segmented into planes.

In the invention according to claim 8, as originally filed, according to the invention recited in claim 1, as originally filed, the point cloud data processing device may further include a noise removing unit that removes noise based on areas of the segmented planes.

According to the invention as recited in claim 8, as originally filed, only planes that characterize the object are extracted.

In the invention according to claim 9, as originally filed, according to the invention recited in claim 1, as originally filed, the point cloud data processing device may further include a label extending unit that adds labels of the nearest planes to points other than the labeled points so as to extend the labeled planes.

According to the invention as recited in claim 9, as originally filed, labels added to the points forming the planes are added to the points of the non-plane areas closest to the planes. Therefore, three-dimensional edges are extracted based on at least one of the lines of intersections of the segmented planes and the convex lines that convexly cover the segmented planes.

In the invention according to claim 10, as originally filed, according to the invention recited in claim 1, as originally filed, the point cloud data may be data in which three-dimensional coordinates of each point are linked with two-dimensional images.

According to the invention as recited in claim 10, as originally filed, the technique of image processing is applied to extract two-dimensional edges which are difficult to obtain by extracting only the three-dimensional coordinates.

In the invention according to claim 11, as originally filed, according to the invention recited in claim 10, as originally filed, the two-dimensional edge extracting unit may extract two-dimensional edges from within areas of the two-dimensional images corresponding to the segmented planes.

According to the invention as recited in claim 11, as originally filed, the three-dimensional edges that primarily form three-dimensional shapes are removed, and only the two-dimensional edges that form figures in the planes are extracted.

In the invention according to claim 12, as originally filed, according to the invention recited in claim 10, as originally filed, the two-dimensional edge extracting unit may extract two-dimensional edges from within areas of the two-dimensional images corresponding to the segmented planes. In addition, the two-dimensional edge extracting unit may identify the two-dimensional edges based on three-dimensional positions of three-dimensional edges in the vicinity of the two-dimensional edges.

According to the invention as recited in claim 12, as originally filed, three-dimensional positions of the two-dimensional edges extracted from the two-dimensional images are identified based on three-dimensional positions of the three-dimensional edges that form the outer edges of the planes.

In the invention according to claim 13, as originally filed, according to the invention recited in claim 1, as originally filed, the point cloud data processing device may further include a rotationally-emitting unit, a distance measuring unit, an emitting direction measuring unit, and a three-dimensional coordinate calculating unit. The rotationally-emitting unit rotationally emits distance measuring light on the object. The distance measuring unit measures a distance from the point cloud data processing device to a target point on the object based on flight time of the distance measuring light. The emitting direction measuring unit measures emitting direction of the distance measuring light. The three-dimensional coordinate calculating unit calculates three-dimensional coordinates of the target point based on the distance and the emitting direction.

According to the invention as recited in claim 13, as originally filed, point cloud data formed of the three-dimensional coordinates is obtained.

In the invention according to claim 14, as originally filed, according to the invention recited in claim 1, as originally filed, the point cloud data processing device may further include a grid forming unit. The grid forming unit forms a grid with equal distances and registers the nearest points on the intersection points of the grid when distances between the points of the point cloud data are not constant.

According to the invention as recited in claim 14, as originally filed, the distances between the points of the point cloud data are corrected.

In the invention according to claim 15, as originally filed, according to the invention recited in claim 13, as originally filed, the point cloud data processing device may further include an imaging unit and a link forming unit. The imaging unit takes an image of the object and obtains a two-dimensional image. The link forming unit forms point cloud data by linking the three-dimensional coordinates of the target point with the two-dimensional image.

According to the invention as recited in claim 15, as originally filed, the three-dimensional edges that form three-dimensional shapes are extracted based on the three-dimensional coordinates. Moreover, the two-dimensional edges (points and lines of which color densities suddenly change) that form figures within the planes are extracted based on the two-dimensional image.

In the invention according to claim 16, as originally filed, according to the invention recited in claim 1, as originally filed, the point cloud data processing device may further include a photographing unit, a feature point matching unit, a photographing position and direction measuring unit, and a three-dimensional coordinate calculating unit. The photographing unit takes images of the object in overlapped photographing areas from different directions. The feature point matching unit matches feature points in overlapping images obtained by the photographing unit. The photographing position and direction measuring unit measures the position and the direction of the photographing unit. The three-dimensional coordinate calculating unit calculates three-dimensional coordinates of the feature points based on the position and the direction of the photographing unit and the positions of the feature points in the overlapping images.

According to the invention as recited in claim 16, as originally filed, point cloud data formed of the three-dimensional coordinates is obtained.

In the invention according to claim 17, as originally filed, the present invention also provides a point cloud data processing program that allow a computer to execute the following steps. The steps include a non-plane removing step, a plane labeling step, a three-dimensional edge extracting step, a two-dimensional edge extracting step, and an edge integrating step. In the non-plane removing step, points of non-plane areas are removed from point cloud data of an object. In the plane labeling step, identical labels are added to points in the same planes other than the points removed by the non-plane removing step so as to segment the point cloud data into planes. In the three-dimensional edge extracting step, three-dimensional edges are extracted based on at least one of lines of intersections of the segmented planes and convex lines that convexly cover the segmented planes. In the two-dimensional edge extracting step, two-dimensional edges are extracted from within the segmented planes. In the edge integrating step, the three-dimensional edges and the two-dimensional edges are integrated.

According to the invention as recited in claim 17, as originally filed, features of the object are extracted from point cloud data thereof, and a three-dimensional model is automatically generated in a short time.

In the invention according to claim 18, as originally filed, the present invention also provides a point cloud data processing method including a non-plane removing step, a plane labeling step, a three-dimensional edge extracting step, a two-dimensional edge extracting step, and an edge integrating step. In the non-plane removing step, points of non-plane areas are removed from point cloud data of an object. In the plane labeling step, identical labels are added to points in the same planes other than the points removed by the non-plane removing step so as to segment the point cloud data into planes. In the three-dimensional edge extracting step, three-dimensional edges are extracted based on at least one of lines of intersections of the segmented planes and convex lines that convexly cover the segmented planes. In the two-dimensional edge extracting step, two-dimensional edges are extracted from within the segmented planes. In the edge integrating step, the three-dimensional edges and the two-dimensional edges are integrated.

According to the invention as recited in claim 18, as originally filed, features of the object are extracted from point cloud data thereof, and a three-dimensional model is automatically generated in a short time.

In the invention according to claim 19, as originally filed, the present invention also provides a point cloud data processing device including a non-plane removing unit, a plane labeling unit, a three-dimensional edge extracting unit, a two-dimensional edge extracting unit, and an edge integrating unit. The non-plane removing unit removes points of non-plane areas from point cloud data of an object. The plane labeling unit adds identical labels to points in the same planes other than the points removed by the non-plane removing unit so as to segment the point cloud data into planes. The three-dimensional edge extracting unit extracts at least one of lines of intersections of the segmented planes and convex lines that convexly cover the segmented planes, as three-dimensional edges. The two-dimensional edge extracting unit extracts two-dimensional edges from within the segmented planes. The edge integrating unit integrates the three-dimensional edges and the two-dimensional edges.

In the invention according to claim 20, as originally filed, the present invention also provides a point cloud data processing device including a non-plane removing unit, a plane labeling unit, a three-dimensional contour extracting unit, a two-dimensional contour extracting unit, and a contour integrating unit. The non-plane removing unit removes points of non-plane areas from point cloud data of an object. The plane labeling unit adds identical labels to points in the same planes other than the points removed by the non-plane removing unit so as to segment the point cloud data into planes. The three-dimensional contour extracting unit extracts three-dimensional contours of the object, based on at least one of lines of intersections of the segmented planes and convex lines that convexly cover the segmented planes. The two-dimensional contour extracting unit extracts two-dimensional contours from within the segmented planes. The contour integrating unit integrates the three-dimensional contours and the two-dimensional contours.

In the invention according to claim 21, as originally filed, the present invention further provides a point cloud data processing device including a non-plane removing unit, a plane extracting unit, and a three-dimensional shape extracting unit. The non-plane removing unit removes points of non-plane areas from point cloud data of an object. The plane extracting unit adds identical labels to points in the same planes other than the points removed by the non-plane removing unit and extracts a plurality of planes that form the object.

The three-dimensional shape extracting unit extracts three-dimensional shapes of the object based on the plurality of the planes.

EFFECTS OF THE INVENTION

According to the present invention, features of an object are extracted from point cloud data thereof, and a three-dimensional model is automatically generated in a short time.

BRIEF DESCRIPTION OF THE DRAWINGS

The patent or application file contains at least one drawing executed in color. Copies of this patent or patent application publication with color drawings will be provided by the Office upon request and payment of the necessary fee.

Figure 1:
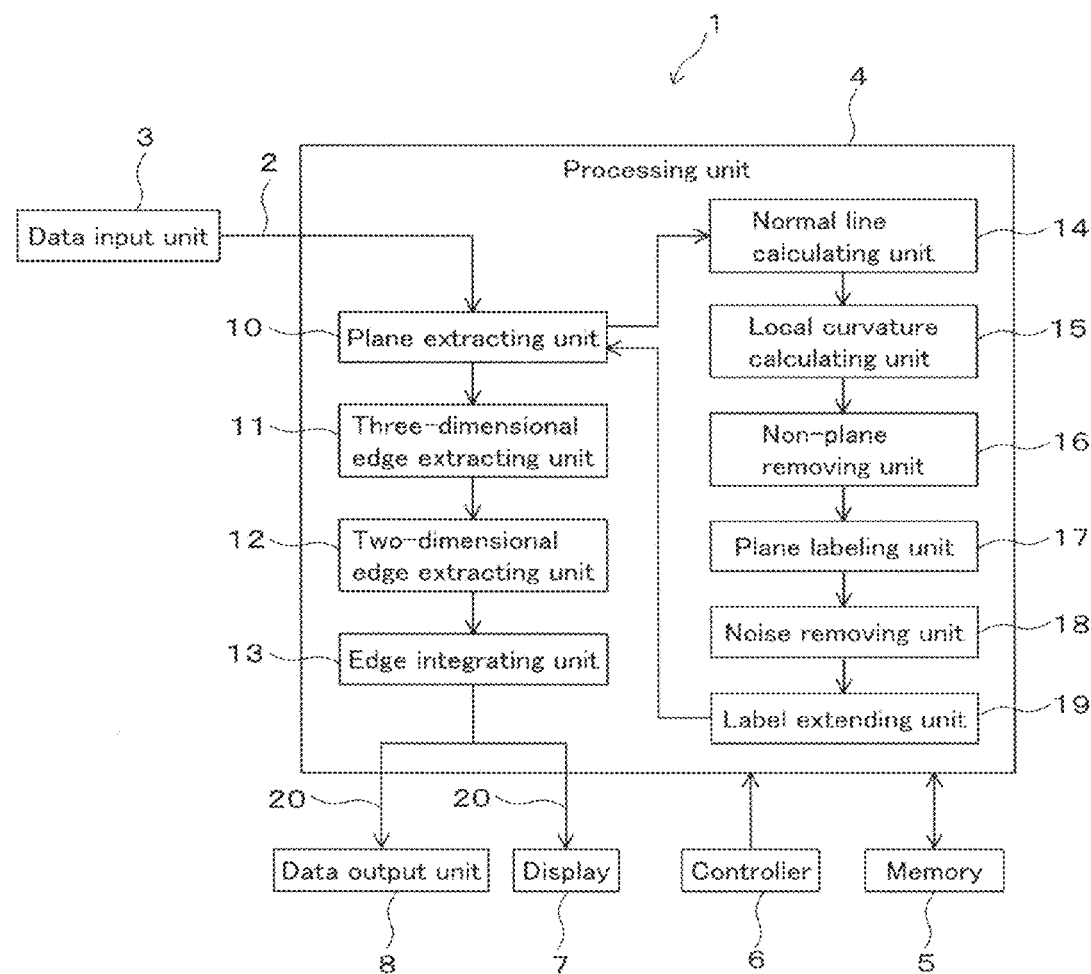
FIG. 1 is a block diagram of a point cloud data processing device.

DETAILED DESCRIPTION OF THE PREFERRED EMBODIMENTS 1 denotes a point cloud data processing device, 2 denotes point cloud data, 3 denotes a data input unit, 4 denotes a processing unit, 5 denotes a memory, 6 denotes a controller, 7 denotes a display, 8 denotes a data output unit, 9 denotes a grid forming unit, 10 denotes a plane extracting unit, 11 denotes a three-dimensional edge extracting unit, 12 denotes a two-dimensional edge extracting unit, 13 denotes an edge integrating unit, 14 denotes a normal line calculating unit, 15 denotes a local curvature calculating unit, 16 denotes a non-plane removing unit, 17 denotes a plane labeling unit, 18 denotes a noise removing unit, 19 denotes a label extending unit, 20 denotes three-dimensional polylines, 22 denotes a level unit, 23 denotes a rotational mechanism, 24 denotes a distance measuring unit, 25 denotes an imaging unit, 26 denotes a controlling unit, 27 denotes a main body, 28 denotes a rotationally-emitting unit, 29 denotes a base plate, 30 denotes a lower casing, 31 denotes a pin, 32 denotes an adjusting screw, 33 denotes an extension spring, 34 denotes a level motor, 35 denotes a level driving gear, 36 denotes a level driven gear, 37 denotes a tilt sensor, 38 denotes a horizontal rotation driving motor, 39 denotes a horizontal rotation driving gear, 40 denotes a horizontal rotation gear, 41 denotes a rotating shaft portion, 42 denotes a rotating base, 43 denotes a bearing, 44 denotes a horizontal angle sensor, 45 denotes a main body casing, 46 denotes a lens tube, 47 denotes an optical axis, 48 denotes a beam splitter, 49, 50 denotes an optical axis, 51 denotes a pulse laser light source, 52 denotes a perforated mirror, 53 denotes a beam waist changing optical system, 54 denotes a distance measuring-light receiver, 55 denotes an elevation adjusting rotating mirror, 56 denotes an optical axis of floodlight, 57 denotes a focusing lens, 58 denotes an image sensor, 59 denotes a floodlight casing, 60 denotes a flange portion, 61 denotes a mirror holding plate, 62 denotes a rotating shaft, 63 denotes an elevation gear, 64 denotes an elevation sensor, 65 denotes an elevation adjusting driving motor, 66 denotes a driving gear, 67 denotes a bead rear sight, 68 denotes an external storage device, 69 denotes a horizontally driving unit, 70 denotes an elevation driving unit, 71 denotes a level driving unit, 72 denotes a distance data processing unit, 73 denotes an image data processing unit, 74 denotes a three-dimensional coordinate calculating unit, 75 denotes a link forming unit, 76, 77 denotes a photographing unit, 78 denotes a feature projector, 79 denotes a calibration object, 80 denotes a target, 81 denotes a photographing position and direction measuring unit, 82 denotes a feature point matching unit, 83 denotes a background removing unit, 84 denotes a feature point extracting unit, 85 denotes a matched point searching unit, 86 denotes a three-dimensional coordinate calculating unit, 87 denotes a mismatched point identifying unit, 88 denotes a disparity evaluating unit, 89 denotes a space evaluating unit, 90 denotes a shape evaluating unit, 91, 92 denotes a plane, 93 denotes a virtual three-dimensional edge, 94 denotes a column, 95 denotes an actual three-dimensional edge, 301 denotes a contour, 302 denotes a plane, 303 denotes a non-plane area, and 304 denotes a plane.

1. First Embodiment

An example of a point cloud data processing device will be described with reference to figures hereinafter.
Structure of Point Cloud Data Processing Device FIG. 1 is a block diagram of a point cloud data processing device. The point cloud data processing device 1 extracts features of an object and generates a three-dimensional model according to the features, based on point cloud data 2 of the object. The features of the object consist of three-dimensional edges and two-dimensional edges. The three-dimensional edges primarily form three-dimensional shapes, and the two-dimensional edges form figures within flat planes and curved planes (hereinafter, simply called "planes"). The three-dimensional edges are lines of intersections of the planes that differ from each other in position and direction and are outer edges of each plane. The two-dimensional edges are points and lines of which color densities suddenly change in a plane. The three-dimensional model generated by the point cloud data processing device 1 is an approximate shape based on the features of the object and is three-dimensional polylines 20 consisting of three-dimensional edges and two-dimensional edges.

As shown in FIG. 1, the point cloud data processing device 1 includes a data input unit 3, a processing unit 4, a memory 5, a controller 6, a display 7, and a data output unit 8. The data input unit 3 is an external storage means such as a flash memory, a magnetic storage means such as a hard disk, or a connecting means to connect to a LAN (Local Area Network), a WAN (Wide Area Network), or the like. The processing unit 4 is a processing means such as a CPU (Central Processing Unit), an ASIC (Application Specific Integrated Circuit), or a PLD (Programmable Logic Device) such as a FPGA (Field Programmable Gate Array). The memory 5 is a main memory means such as a RAM (Random Access Memory) or the like. The controller 6 is a controlling means such as a set of a mouse and a keyboard, a touch panel, or the like. The display 7 is a displaying means such as a liquid crystal display. The data output unit 8 has the same structure as that of the data input unit 3.

The processing unit 4 is controlled by the controller 6 and retrieves point cloud data 2 from the data input unit 3. The point cloud data 2 consists primarily of three-dimensional coordinates and RGB intensity (two-dimensional images). The point cloud data 2 retrieved from the data input unit 3 is stored in the memory 5. The processing unit 4 extracts three-dimensional edges and two-dimensional edges of an object based on the point cloud data 2 stored in the memory 5. The three-dimensional edges and two-dimensional edges extracted by the processing unit 4 are displayed on the display 7 as three-dimensional polylines 20. The display 7 can simultaneously display the three-dimensional polylines 20 in a two-dimensional space and in a three-dimensional space. The three-dimensional polylines 20 can be output to the data output unit 8 as CAD (Computer Aided Design) data.

The structure of the processing unit 4 will be described in detail hereinafter. The processing unit 4 includes a plane extracting unit 10, a three-dimensional edge extracting unit 11, a two-dimensional edge extracting unit 12, and an edge integrating unit 13. These are constructed of programs executed by a CPU, or an ASIC, or a PLD such as a FPGA. The plane extracting unit 10 extracts planes from the point cloud data 2. The plane extracting unit 10 is formed of a normal line calculating unit 14, a local curvature calculating unit 15, a non-plane removing unit 16, a plane labeling unit 17, a nose removing unit 18, and a label extending unit 19.

The normal line calculating unit 14 calculates a normal vector of each point in a local plane. The local curvature calculating unit 15 calculates variations (local curvatures) of the normal vectors in the local areas. The non-plane removing unit 16 removes points of non-plane areas based on (1) portions with high local curvature, (2) fitting accuracy to the local planes, and (3) coplanarity. The non-plane areas are areas other than flat planes and curved planes, but there may be cases in which curved planes with high curvature are included according to threshold values of the conditions (1) to (3). The plane labeling unit 17 adds identical labels to remaining points in the same planes based on continuity of the normal vectors. The noise removing unit 18 removes labels (planes) with small area as noise. The label extending unit 19 adds labels of the nearest planes to points with no label and thereby extends labeled areas. As a result, planes are extracted from the point cloud data 2.

In this condition, if points with no label still exist, relabeling may be performed by automatically adjusting each threshold value of the non-plane removing unit 16, the noise removing unit 18, and the label extending unit 19. Moreover, the labels may be integrated when the planes have different labels but are in the same plane. That is, identical labels are added to planes that have the same position or the same direction, even if the planes are not connected. In this case, the processing unit 4 shown in FIG. 1 further includes a relabeling unit or a label integrating unit next to the label extending unit 19.

The three-dimensional edge extracting unit 11 extracts three-dimensional edges based on at least one of lines of intersections of the planes, which are extracted by the plane extracting unit 10, and convex lines that convexly cover the extracted planes. The two-dimensional edge extracting unit 12 extracts provisional two-dimensional edges from within the planes segmented by the plane extracting unit 10. Then, the two-dimensional edge extracting unit 12 extracts edges that approximately correspond to three-dimensional positions of three-dimensional edges in the vicinity of the provisional two-dimensional edges, as two-dimensional edges.

The edge integrating unit 13 integrates the three-dimensional edges extracted by the three-dimensional edge extracting unit 11 and the two-dimensional edges extracted by the two-dimensional edge extracting unit 12, thereby generating three-dimensional polylines 20. The edge integrating unit 13 is an example of a means for calculating three-dimensional contours of the object and is an example of a contour integrating unit of the present invention. In addition, the edge integrating unit 13 integrates the three-dimensional edges and the two-dimensional edges that are extracted based in the planes extracted by the plane extracting unit 10. Then, the edge extracting unit 13 calculates data (in this example, three-dimensional polylines) that is necessary to figure out the three-dimensional shapes of the object. In this regard, the edge integrating unit 13 is an example of a three-dimensional shape extracting unit that extracts three-dimensional shapes of an object based on plural planes extracted by the plane extracting unit 10.

When the point cloud data 2 consists of plural point cloud data (blocks) that are measured from different directions, the processing of the processing unit 4 is repeated with respect to each block. Then, the processing unit 4 transforms points of three-dimensional edges and two-dimensional edges extracted from each block, into the same coordinates, thereby generating three-dimensional polylines 20 in plural directions.

Operation of Point Cloud Data Processing Device

Figure 2:
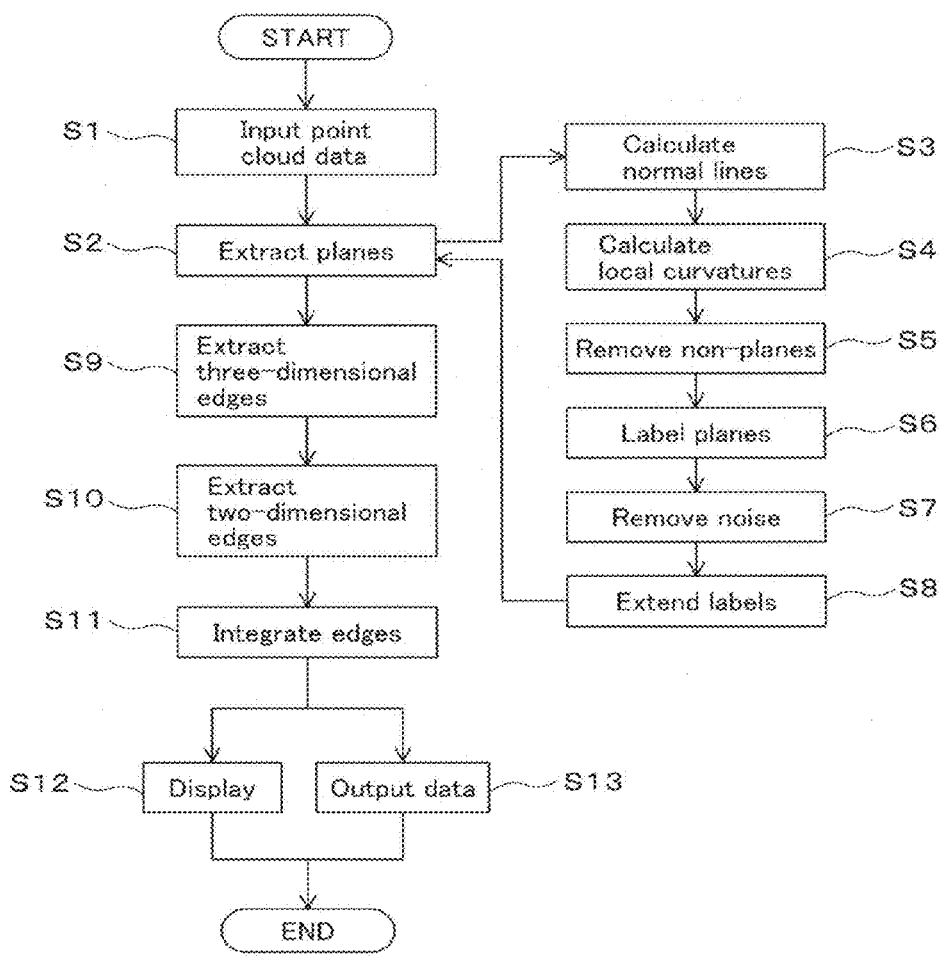
FIG. 2 is a flow chart showing a processing flow of a processing unit.

A plane labeling processing and a three-dimensional shape extracting processing will be described in detail hereinafter. The processing unit 4 performs the plane labeling processing and the processing of extracting three-dimensional shapes of an object based on planes that are labeled in the plane labeling processing. FIG. 2 is a flow chart showing a processing flow of the processing unit. The flow chart is executed by programs that may be provided by way of a computer-readable recording medium such as a CD-ROM.

The processing unit 4 retrieves the point cloud data 2 (step S1) and extracts planes therefrom (step S2). In this case, in order to extract the planes, the processing unit 4 calculates a normal vector of each point in a local plane (step S3). A method for calculating the normal vector will be described hereinafter.

In square areas of approximately 3 to 7 pixels (local areas of 3×3, 5×5, or the like) having a target point at the center, equations of local planes are obtained from three-dimensional coordinates of each point (local plane fitting). The local plane fitting is performed by the least-squares method. In this case, in order to accurately form the equations of the local planes, it is preferable to form three different flat plane equations shown by First Formula and to compare them. In the case of the First Formula, the normal vectors (nvx, nvy, nvz) are (a1, b1, −1), (a2, −1, b2), and (−1, a3, b3). In addition, normalizing is performed so that the normal vectors have a magnitude of 1 (in a range of −1 to 1).

$$z = a1x + b1y + c1$$

$$y = a2x + b2z + c2$$

$$x = a3y + b3z + c3 \quad \text{First Formula}$$

Figure 3:
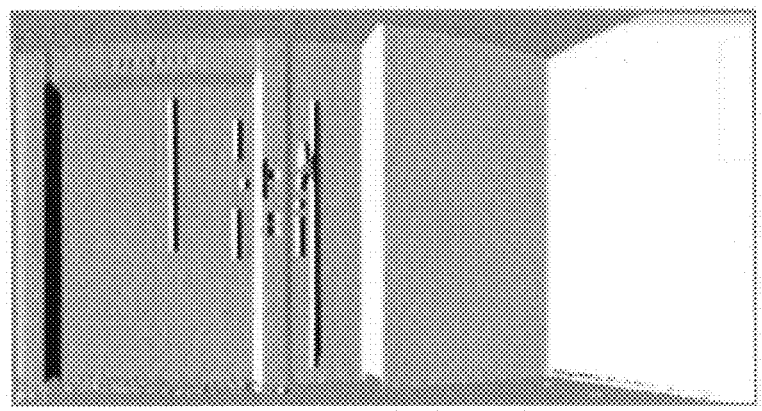
FIG. 3 is a photograph in substitution for a drawing showing an intensity image (nvx) of normal vectors in an x-axis direction.
Figure 4:
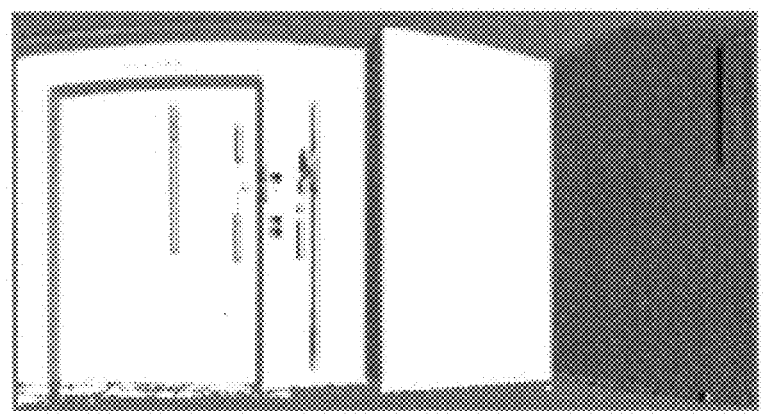
FIG. 4 is a photograph in substitution for a drawing showing an intensity image (nvy) of normal vectors in a y-axis direction.
Figure 5:
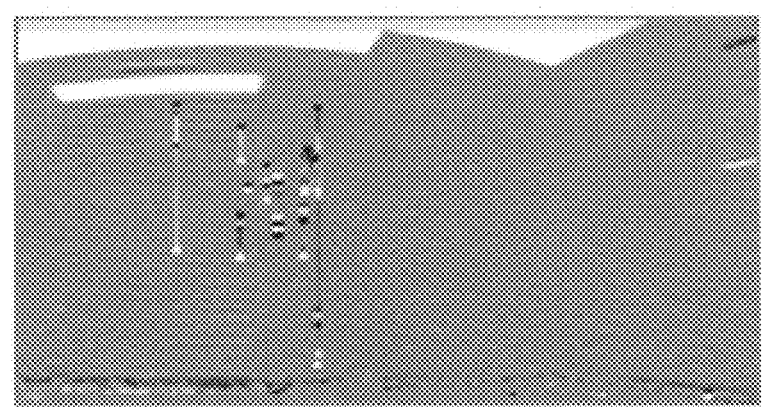
FIG. 5 is a photograph in substitution for a drawing showing an intensity image (nvz) of normal vectors in a z-axis direction.

FIG. 3 is a photograph in substitution for a drawing showing an intensity image (nvx) of normal vectors in an x-axis direction. FIG. 4 is a photograph in substitution for a drawing showing an intensity image (nvy) of normal vectors in a y-axis direction. FIG. 5 is a photograph in substitution for a drawing showing an intensity image (nvz) of normal vectors in a z-axis direction. FIGS. 3 to 5 show results of using local planes of 7×7.

Next, variations (local curvatures) of the normal vectors in the local areas are calculated (step S4). In square areas of approximately 3 to 7 pixels having a target point at the center, averages (mnvx, mnvy, mnvz) of intensity values (nvx, nvy, nvz) of the three axis components of the normal vectors are calculated. In addition, standard deviations (stdnvx, stdnvy, stdnvz) are calculated. Then, as shown in the Second Formula, a square-root of a sum of squares of the standard deviations is calculated as a local curvature (cry).

$$\text{LocalCurveture} = \sqrt{(\text{Std}NVx^2 + \text{Std}NVy^2 + \text{Std}NVz^2)} \quad \text{Second Formula}$$

Figure 6:
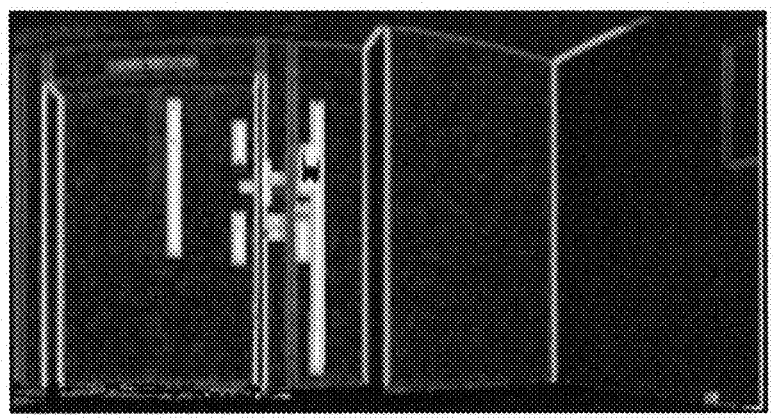
FIG. 6 is a photograph in substitution for a drawing showing a curvature image (stdnvx) in an x-axis direction.
Figure 7:
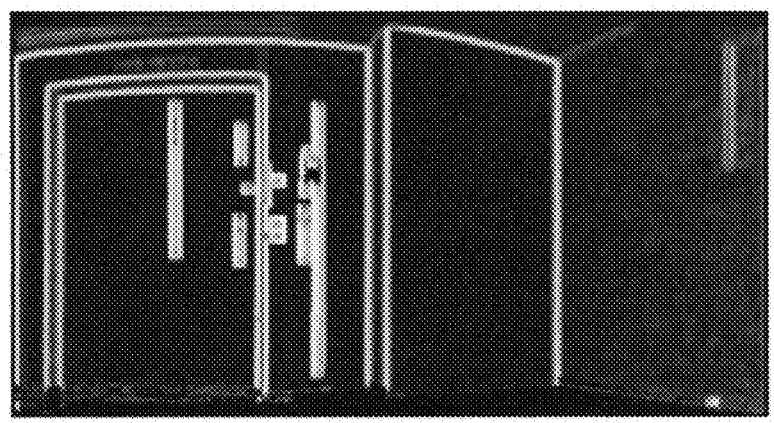
FIG. 7 is a photograph in substitution for a drawing showing a curvature image (stdnvy) in a y-axis direction.
Figure 8:
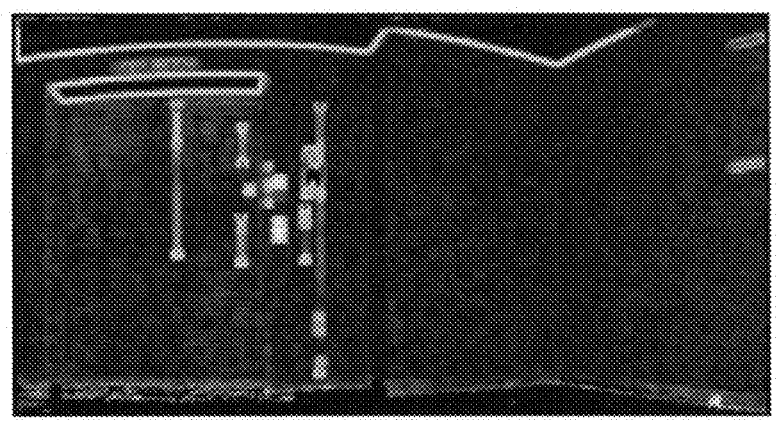
FIG. 8 is a photograph in substitution for a drawing showing a curvature image (stdnvz) in a z-axis direction.
Figure 9:
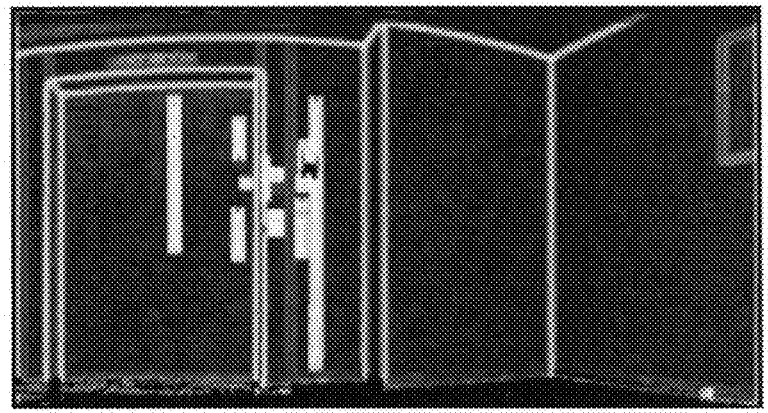
FIG. 9 is a photograph in substitution for a drawing showing a local curvature image (crv).

FIG. 6 is a photograph in substitution for a drawing showing a curvature image (stdnvx) in an x-axis direction. FIG. 7 is a photograph in substitution for a drawing showing a curvature image (stdnvy) in a y-axis direction. FIG. 8 is a photograph in substitution for a drawing showing a curvature image (stdnvz) in a z-axis direction. FIG. 9 is a photograph in substitution for a drawing showing a local curvature image (cry).

Then, points of non-plane areas are removed (step S5). That is, in order to extract planes (flat planes and curved planes), portions (non-plane areas) that are identified as non-planes are preliminarily removed. The non-plane removing processing is performed by at least one of the following three methods. The non-plane areas are areas other than flat planes and curved planes, but there may be cases in which curved planes with high curvature are included, according to threshold values of the methods (1) to (3).

(1) Portions with High Local Curvature

Points of portions with high local curvature that is calculated in the step S4 are removed. The local curvature indicates variation of normal vectors of the target point and surrounding points. Therefore, the local curvature is small with respect to planes (flat planes and curved planes with small curvature), whereas the local curvature is large with respect to areas other than the planes. Accordingly, when the local curvature is greater than a predetermined threshold value, the target point is determined to be not on the plane. That is, the local curvature image in FIG. 9 is binarized, and portions with local curvature that is greater than the threshold value are removed.

(2) Fitting Accuracy of Local Plane

Figure 10:
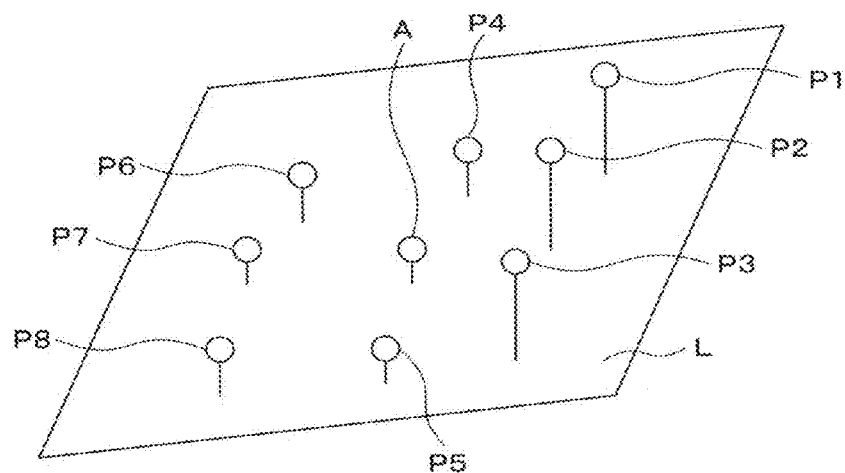
FIG. 10 is a view showing distances between a local plane and points used for calculating the local plane.

Distances between a local plane and each point used for calculating the local plane obtained in the step S4 are calculated. When an average of these distances is greater than a predetermined threshold value, the target point is determined to be not on the plane. FIG. 10 is a view showing the distances between a local plane and the points used for calculating the local plane. The local plane L is selected by setting a point A on a plane. The point A has average coordinates of points P1 to P8 that are used for calculating the local plane.

(3) Check of Coplanarity

Figure 11:
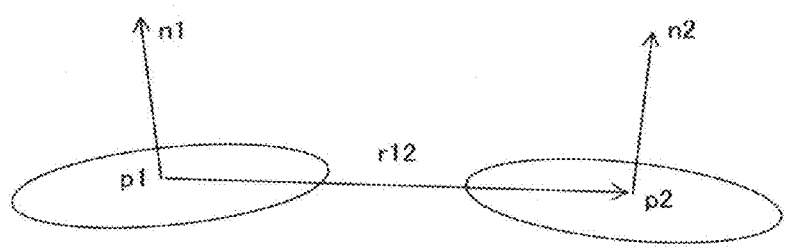
FIG. 11 is an explanatory drawing for describing a method for evaluating coplanarity.

FIG. 11 is an explanatory diagram for describing a method for evaluating coplanarity. In this case, a local plane p1 and a local plane p2 have a normal vector n1 and n2, respectively, and a vector connecting the points that set the plane is represented as r12. When the local planes p1 and p2 are in the same plane, the normal vectors n1 and n2 and the r12 connecting the local planes cross each other at almost right angles, whereby inner products thereof are close to zero. By using this function, when a value of the greater of the inner products is greater than a predetermined threshold value, the target point is determined to be not on the plane (Third Formula).

$$\vec{n1}\cdot\vec{r12}=|\vec{n1}|\cdot|\vec{r12}|\cos\theta$$

$$\vec{n2}\cdot\vec{r21}=|\vec{n2}|\cdot|\vec{r21}|\cos\theta$$

$$\text{MAX}(|\vec{n1}\cdot\vec{r12}|,|\vec{n2}\cdot\vec{r21}|)$$

According to the method (1), sharp three-dimensional edges that are generated by change of directions of planes, and non-plane areas including smooth three-dimensional edges that are generated by curved planes with large curvature, are extracted. According to the method (2), non-plane areas including three-dimensional edges that are generated by occlusion are extracted because they have points of which positions suddenly change. The "occlusion" is a condition in which the inner portions are hidden by the front portions and cannot be seen. According to the method (3), non-plane areas including sharp three-dimensional edges that are generated by change of directions of planes are extracted.

Figure 12:
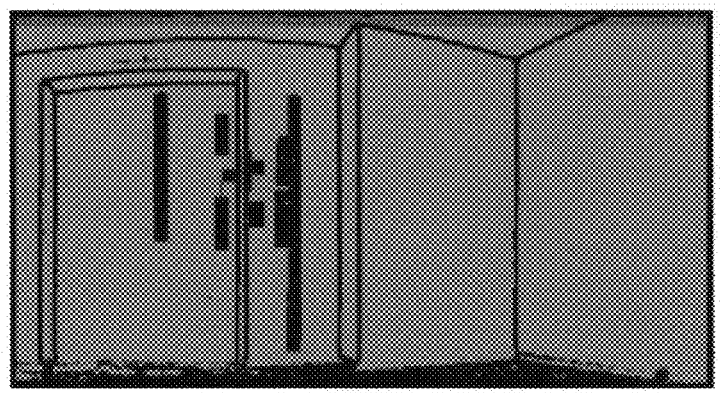
FIG. 12 is a photograph in substitution for a drawing showing a result of non-plane removing in a two-dimensional space.
Figure 13:
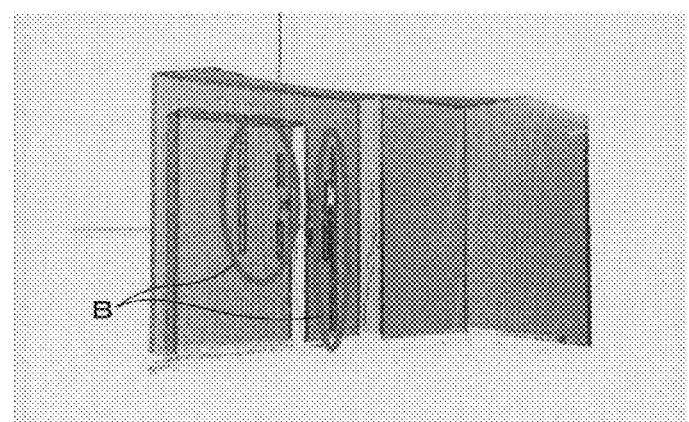
FIG. 13 is a photograph in substitution for a drawing showing a result of non-plane removing in a three-dimensional space.
Figure 14:
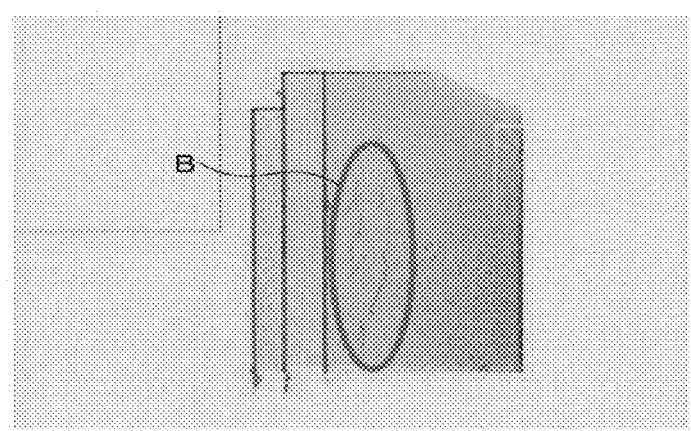
FIG. 14 is a photograph in substitution for a drawing showing a result of non-plane removing from a different direction from that of FIG. 13.

The above three methods are sequentially performed, and the results are shown in FIGS. 12 to 14. FIG. 12 is a photograph in substitution for a drawing showing a result of the non-plane removing in a two-dimensional space. FIG. 13 is a photograph in substitution for a drawing showing a result of the non-plane removing in a three-dimensional space. FIG. 14 is a photograph in substitution for a drawing showing a result of the non-plane removing from a different direction from that in FIG. 13. Black portions in FIGS. 12 to 14 are pixels that are removed by this processing, and portions between planes that have different directions are removed. As shown by circles B in FIGS. 13 and 14, there are portions that are identified as non-plane areas even though they are plane areas. These portions indicate passersby during taking of the point cloud data 2. Thus, by removing the non-planes, large noise such as trees in front of the object and passersby are also removed.

Next, plane labeling is performed on remaining points based on continuity of the normal vectors (step S6). Specifically, in the 8 vicinity, when an angular difference between the normal vectors of the target point and the adjacent point is not more than a predetermined threshold value, an identical label is added. After the plane labeling, whether the label (plane) is a flat plane or a curved plane with small curvature is evaluated by the angular difference between the normal vectors and the standard deviations of the three axis components of the normal vectors.

Figure 15:
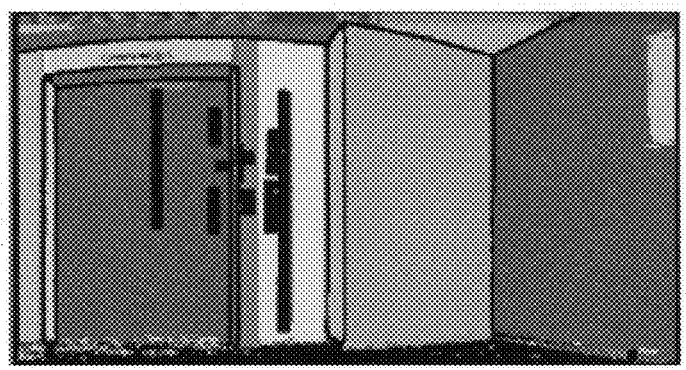
FIG. 15 is a photograph in substitution for a drawing showing a result of plane labeling in a two-dimensional space.
Figure 16:
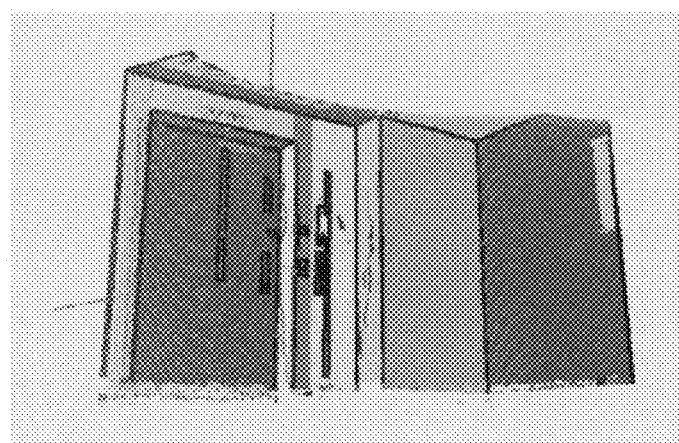
FIG. 16 is a photograph in substitution for a drawing showing a result of plane labeling in a three-dimensional space.

FIG. 15 is a photograph in substitution for a drawing showing a result of the plane labeling in a two-dimensional space. FIG. 16 is a photograph in substitution for a drawing showing a result of the plane labeling in a three-dimensional space. FIGS. 15 and 16 show planes with 10 different colors, but the planes having the same color are not in the same planes as long as the labels of the planes are not connected with each other in the 8 vicinity.

Figure 17:
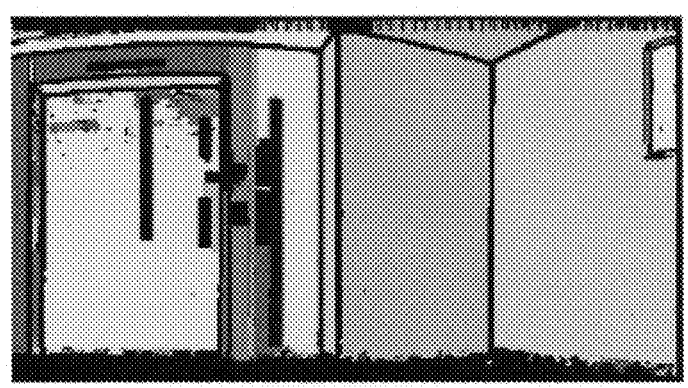
FIG. 17 is a photograph in substitution for a drawing showing a result of noise removing.

Then, labels (planes) with small area are removed as noise (step S7). The noise removing and the processing of the plane labeling in the step S7 may be performed at the same time. That is, while the plane labeling is performed, a total number is counted with respect to each identical label, and identical labels of which the total number is not more than a predetermined number are removed. FIG. 17 is a photograph in substitution for a drawing showing a result of the noise removing. As show in FIG. 17, small labels that existed at the upper end and the lower end were removed as noise (colored in black in FIG. 17).

Figure 18:
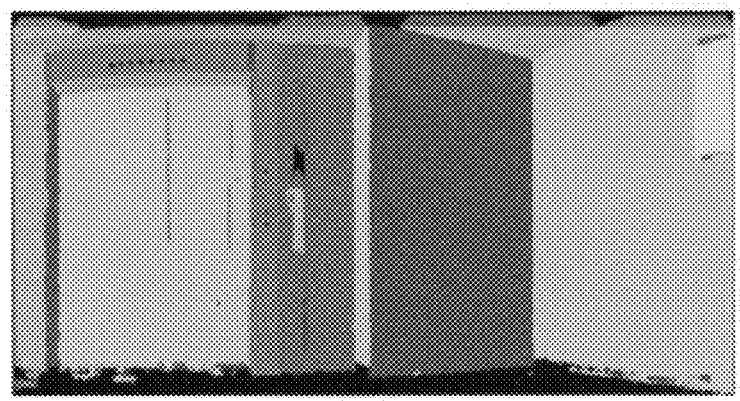
FIG. 18 is a photograph in substitution for a drawing showing a result of label extending in a two-dimensional space.
Figure 19:
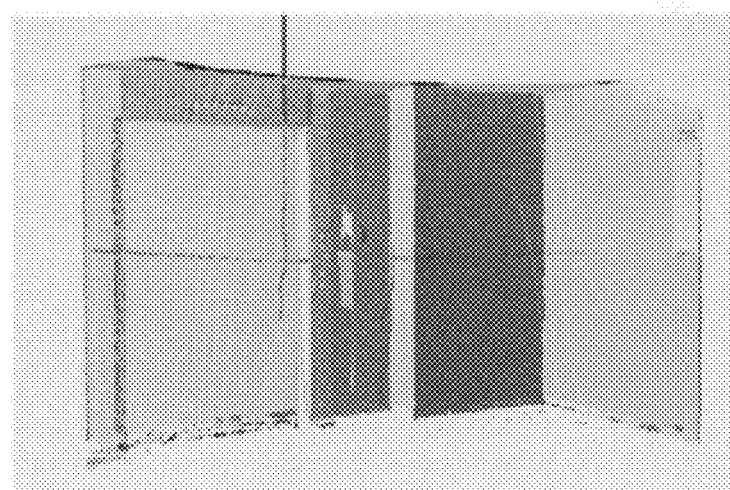
FIG. 19 is a photograph in substitution for a drawing showing a result of label extending in a three-dimensional space.

Next, identical labels of the nearest planes are added to points that still do not have a label. That is, the planes that are already labeled are extended (step S8). First, an equation of the plane with a label is obtained, and a distance between the plane and a point with no label is calculated. When plural labels (planes) exist around the point with no label, a label having the shortest distance is selected. FIG. 18 is a photograph in substitution for a drawing showing a result of the label extending in a two-dimensional space. FIG. 19 is a photograph in substitution for a drawing showing a result of the label extending in a three-dimensional space. As shown in FIGS. 18 and 19, labels are extended to the inside of the planes and to the end portions of the planes. Thus, planes are extracted from the point cloud data 2 (step S2).

If points with no label still exist, relabeling is performed by automatically adjusting each threshold value in the non-plane removing processing (step S5), the noise removing processing (step S7), and the label extending processing (step S8). For example, by increasing the threshold value of the local curvature in the non-plane removing processing (step S5), fewer points are extracted as non-planes. In another case, by increasing the threshold value of the distance between the point with no label and the nearest plane in the label extending processing (step S8), labels are added to more of the points with no label.

When planes have different labels but are in the same planes, the labels of the planes may be integrated. That is, identical labels are added to planes that have the same position or the same direction, even if the planes are not continuous planes. Specifically, by comparing the positions and the directions of the normal vectors of each plane, discontinuous same planes are extracted, and the labels thereof are integrated into one of the labels thereof.

Then, lines of intersections of the extracted planes and convex lines that convexly cover the extracted planes are calculated, and three-dimensional edges are extracted based on them (step S9). The two methods will be described hereinafter. In using the following two methods, one of the two methods or both methods may be used. When both methods are used, averages of the results of the both methods, or more appropriate calculating results of the both methods, are used. Alternatively, one of the two methods may be selected according to the circumstances.

(1) Using Lines of Intersections as Three-Dimensional Edges

In this method, two adjacent planes are extracted and assumed to be endless planes, and a line of intersection of the two planes is extracted as a three-dimensional edge. Each label is identified with a flat plane or a curved plane in the plane labeling processing in the step S6. Therefore, the three-dimensional edge is obtained as a line of intersection of a pair of flat plane and flat plane, a pair of flat plane and curved plane, or a pair of curved plane and curved plane.

For example, when the two adjacent planes are flat planes, normal vectors "a" and "b" thereof are obtained. Then, an outer product "a×b" of the normal vectors "a" and "b" is calculated, whereby a vector of a line of intersection is obtained (Fourth Formula). Next, one point on the line of the intersection is calculated from equations of the two planes. Thus, the line of the intersection is obtained.

Fourth Formula $$\vec{a}=(a_x,a_y,a_z), \vec{b}=(b_x,b_y,b_z)$$

$$\vec{a}\times\vec{b}=(a_yb_z-a_zb_y,a_zb_x-a_xb_z,a_xb_y-a_yb_x)$$

Figure 20:
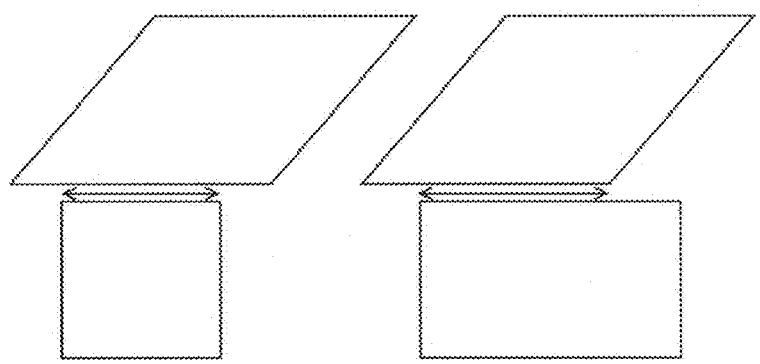
FIG. 20 is a view showing sections at which two adjacent planes intersect each other.
Figure 21:
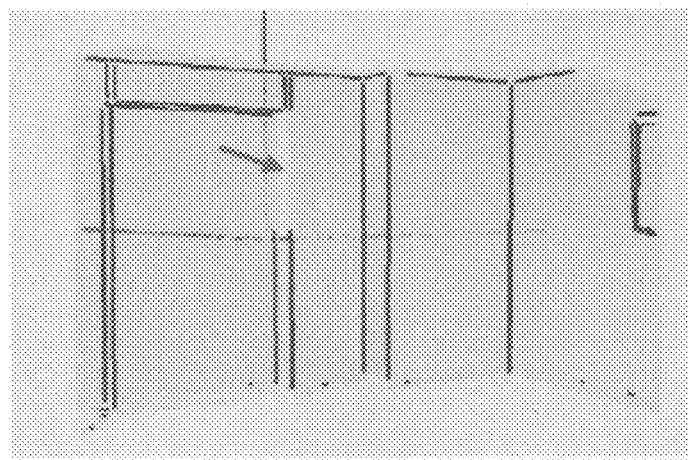
FIG. 21 is a photograph in substitution for a drawing showing three-dimensional edges formed of lines of intersections of two adjacent planes.

The obtained line of the intersection is an endless straight line. Therefore, by calculating a section, at which the two planes intersect with each other, and end point coordinates of the section, the line of the intersection is formed into a line segment. FIG. 20 is a view showing sections at which two adjacent planes intersect with each other. FIG. 21 is a photograph in substitution for a drawing showing three-dimensional edges formed of lines of intersections of two adjacent planes. In this method, since the line of the intersection cannot be obtained if there are no adjacent planes, three-dimensional edges cannot be extracted from outside portions of the object. FIG. 21 shows an arrow which indicates a portion of a plane of which point cloud data could not be obtained. Since this portion does not have an adjacent plane, three-dimensional edges cannot be extracted.

(2) Obtaining Three-Dimensional Edges Based on Convex Lines

In this method, points at an outside portion of each label (plane) are extracted and connected so as to form three-dimensional edges. Specifically, in a case of a relatively ordinary cubic object, points of an outside portion of a plane are extracted in a two-dimensional image, and adjacent extracted points are connected by lines. If an angle between the plane and the line segment of a target point and the adjacent point is greater than 90°, the target point is removed. Then, the remaining adjacent points are connected. By repeating this step, a convex line that convexly covers the plane is formed.

Figure 38A:
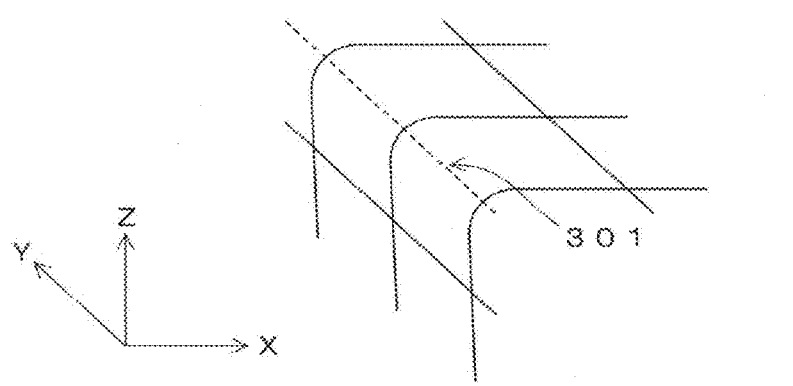
FIGS. 38A to 38C are conceptual diagrams showing a function for calculating a convex line.
Figure 38B:
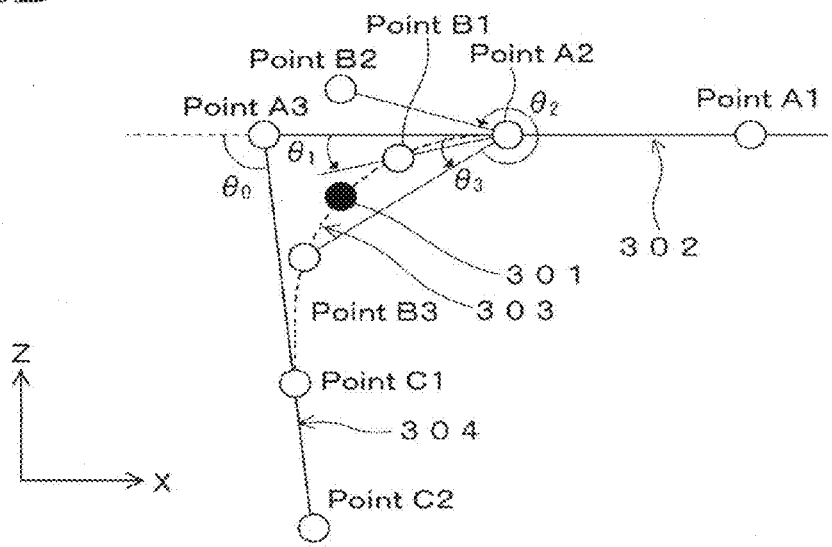

An example of a processing for obtaining a convex line of a label and calculating a contour is described hereinafter. FIG. 38A shows a contour 301 that extends in a y-axis direction. An example of a method for calculating a convex line that approximates the contour 301 will be described as follows. First, a cross section may be taken along a plane Z-X in FIG. 38A. FIG. 38B conceptually shows one of the cross sections taken along the plane Z-X and shows labeled planes 302, 304 and a non-plane area 303 between the planes 302 and 304. The measured points B1, B2, and B3 are not included in the labeled planes and correspond to target points. In this example, the actual contour 301 exists at the center portion in the non-plane area 303. FIG. 38B shows an example in which the measured point B2 is positioned apart from the actual non-plane area 303 due to measurement error caused by reflection condition of laser light or the like.

Figure 38C:
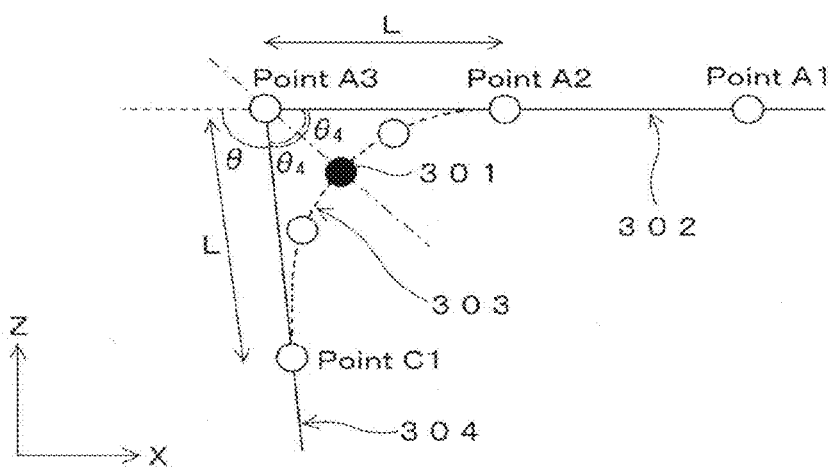

In this case, a convex line passing by the vicinity of the actual contour 301 is calculated. First, an adjacent point A3 is obtained in FIG. 38B. The adjacent point A3 is calculated as an intersection of a portion of the plane 302, which is outwardly extended from a point A2 at an edge portion thereof, and a portion of the adjacent other plane 304 that is outwardly extended. Thus, the adjacent point A3 is extracted at the outside of the plane 302. An angle $\theta_0$ between the plane 302 and a plane extended from the plane 304 is calculated. The plane 304 includes adjacent points C1 and C2, which are included in a labeled plane that is adjacent to the plane 302. Next, virtual lines connecting the adjacent point A2 to each of the measured points B1, B2, and B3 in the non-plane area 303 are assumed, and angles $\theta_1$, $\theta_2$, and $\theta_3$ are measured from the extended portion of the plane 302 in the counterclockwise direction. The angles that are not greater than the angle $\theta_0$ are selected from among the angles $\theta_1$, $\theta_2$, and $\theta_3$, and angles that are greater than the angle $\theta_0$ are removed. In the case of FIG. 38B, the points B1 and B3 are selected, and the point B2 is removed. An approximate curve connecting the selected points (in this case, the points B1 and B3) is calculated as a convex line. FIG. 38B shows a case in which there are few errors and the convex line of the approximate curve approximately corresponds to the cross sectional shape of the non-plane area 303. In other words, FIG. 38B shows a case in which the approximate curve connecting the points B1 and B3 approximately corresponds to the curve indicated by the reference numeral 303. As shown in FIG. 38C, in the obtained convex line, a middle point between the labeled planes, and a portion at which the angle of the normal line made on the approximate curve is half of the angle between the labeled planes, are set as contour positions (contour passing points). FIG. 38C shows a case in which the actual contour 301 approximately corresponds with the calculated contour positions. The approximate curve of the convex line may be obtained as a line connecting straight lines with very small length. The above processing is performed at plural positions on the y-axis, and a line connecting plural contour passing points that are calculated on the y-axis is calculated as a contour. Thus, the convex line that convexly covers a corner of the bent planes as shown in FIG. 38B is obtained. Accordingly, three-dimensional edges approximate to the actual contour 301 are calculated based on the convex line.

Figure 22:
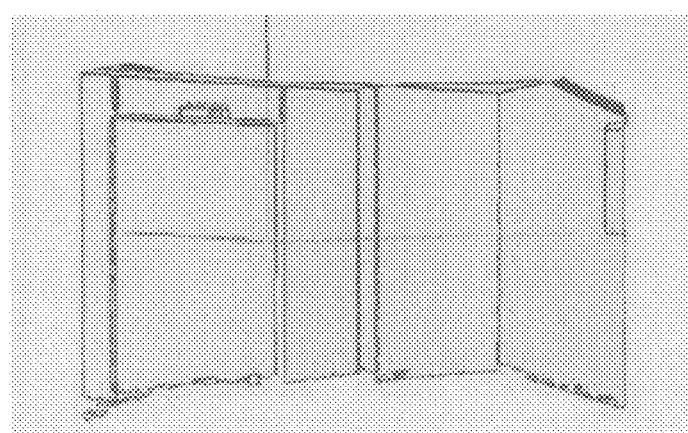
FIG. 22 is a photograph in substitution for a drawing showing three-dimensional edges based on convex lines.

If the value of a distance L is decreased, the amount of calculation is increased, but resolution is improved, whereby a difference between the convex line and the actual contour is reduced. Conversely, if the value of L is increased, the amount of calculation is decreased, but the resolution is degraded, whereby the difference between the convex line and the actual contour is increased. Thus, by setting the value of L, the calculation accuracy can be changed. FIG. 22 is a photograph in substitution for a drawing showing an example of three-dimensional edges based on convex lines.

As a method for extracting the three-dimensional edges, a method of applying the planes to models may be used. Alternatively, a method of adjusting threshold values repeatedly according to the local curvatures so as to make something like three-dimensional edges to remain may be used.

Figure 23:
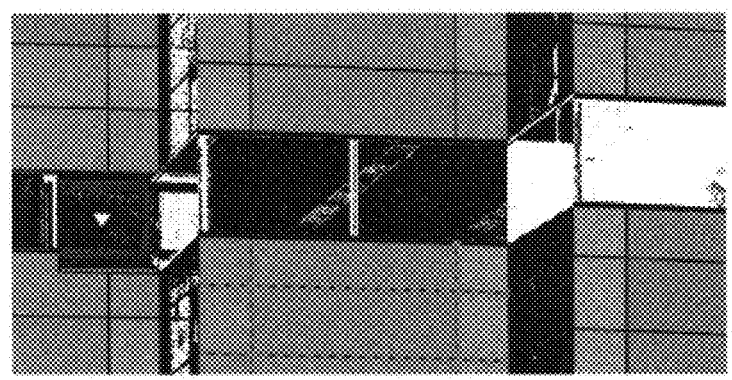
FIG. 23 is a photograph in substitution for a drawing showing two-dimensional edges to be extracted.

Then, provisional two-dimensional edges are extracted from within areas of two-dimensional images corresponding to the planes segmented in the step S2. In addition, edges that approximately correspond to three-dimensional positions of three-dimensional edges in the vicinity of the provisional two-dimensional edges are extracted as two-dimensional edges (step S10). Accordingly, two-dimensional edges that form figures within planes and that are difficult to extract as three-dimensional edges, are extracted. FIG. 23 is a photograph in substitution for a drawing showing two-dimensional edges to be extracted. For example, the dotted line shown in FIG. 23 is extracted as the two-dimensional edges.

First, by a publicly known edge extracting operator such as Laplacian, Prewitt, Sobel, or Canny, provisional edges are extracted from within areas of two-dimensional images corresponding to the planes segmented in the step S2. Next, a height (z value) of a three-dimensional coordinate of a point forming the provisional edge is compared with that of a point forming a three-dimensional edge in the vicinity of the provisional edge. When this difference is not more than a predetermined threshold value, the provisional edge is extracted as a two-dimensional edge. That is, whether the point forming the provisional edge extracted from the two-dimensional image is on the segmented plane or not is evaluated.

Figure 24:
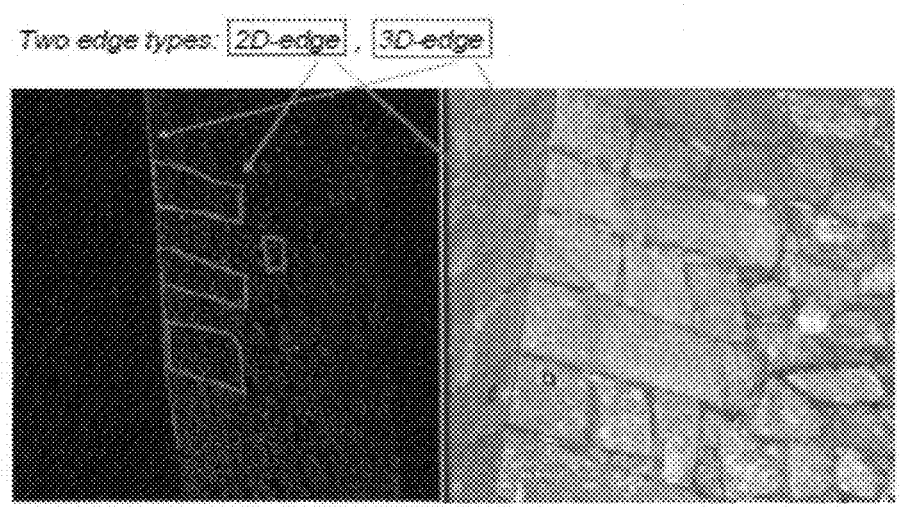
FIG. 24 is a photograph in substitution for a drawing showing three-dimensional edges and two-dimensional edges in a two-dimensional space and a three-dimensional space.

Next, the three-dimensional edges extracted in the step S9, and the two-dimensional edges extracted in the step S10, are integrated, thereby generating three-dimensional polylines 20 (step S11). The three-dimensional polylines 20 are displayed in a two-dimensional space and a three-dimensional space (step S12). FIG. 24 is a photograph in substitution for a drawing showing three-dimensional edges and two-dimensional edges in a two-dimensional space and a three-dimensional space. When an edge is selected in one of the two-dimensional space and the three-dimensional space, a corresponding edge is displayed in the other. The three-dimensional polylines 20 are converted into CAD data with a predetermined format and is output as data (step S13). Thus, the three-dimensional polylines 20 for understanding the appearance of the object is calculated based on the labeled planes. According to the three-dimensional polylines 20, a three-dimensional model representing the appearance of the object can be displayed and be printed. The series of the steps relating to the calculation of the three-dimensional polylines 20 may be used as a processing for extracting three-dimensional shapes of an object based on labeled planes. As described above, in this embodiment, the object is assumed to be an entire series of planes, and the three-dimensional shapes of the object are evaluated based on the extracted plural planes.

Advantages of the First Embodiment

Advantages of the First Embodiment will be described hereinafter. According to the First Embodiment, each point of the point cloud data 2 is segmented into planes. Then, three-dimensional edges are extracted based on at least one of lines of intersections of the segmented planes and convex lines that convexly cover the segmented planes. In addition, two-dimensional edges are extracted from within the segmented planes. Next, the three-dimensional edges and the two-dimensional edges are integrated. As described above, the point cloud data processing device 1 do not directly extract edges formed of various shapes. Therefore, the extracted edges have little noise, and the three-dimensional edges and the two-dimensional edges are automatically extracted from the point cloud data 2. Moreover, since the planes are more easily extracted than edges, the three-dimensional edges and the two-dimensional edges are extracted in a short time.

According to the First Embodiment, the appearance of the object is assumed to be an entire series of planes. In this case, boundaries that divide adjacent planes are calculated from the plane data as the three-dimensional edges. According to this method, the shape of the object is evaluated as a whole series of planes that are easy to use as data, whereby load of the calculation is small, and the shape of the object is quantitatively evaluated faster.

The point cloud data processing device 1 removes points of the non-plane areas based on the local curvatures. Therefore, points of the non-plane areas including the sharp three-dimensional edges, the smooth three-dimensional edges, and noise, are removed. The sharp three-dimensional edges are generated by changes of the directions of the planes, and the smooth three-dimensional edges are generated by curved planes with large local curvatures.

Accordingly, points of the non-plane areas including noise and the three-dimensional edges that are generated by occlusion, are removed. The "occlusion" is a condition in which the inner portions are hidden by the front portions and cannot be seen. The fitting accuracy to a local plane is, for example, an average value of distances between a local plane and each point used for calculating the local plane. The three-dimensional edges generated by the occlusion contain points of the inner portions and the front portions, in which three-dimensional positions differ greatly. Therefore, according to the fitting accuracy to the local planes, the points of the non-plane areas including noise and such three-dimensional edges are removed.

The point cloud data processing device 1 removes points of the non-plane areas based on the coplanarity of a target point and the adjacent point. When a target point and the adjacent point have coplanarity, a normal line of each point and a line segment connecting the points cross each other at right angles, and an inner product thereof is zero. According to this condition, points of the non-plane areas including noise and the sharp three-dimensional edges generated by changes of the directions of the planes are removed.

In addition, the point cloud data processing device 1 adds labels of the nearest planes to points with no label so as to extend the labeled area. That is, labels added to the points forming the planes are added to the points of the non-plane areas closest to the planes. Therefore, three-dimensional edges are extracted based on at least one of lines of intersections of the segmented planes and convex lines that convexly cover the segmented planes.

Moreover, the point cloud data 2 are data in which the three-dimensional coordinates of each point are linked with the two-dimensional images. Therefore, the image processing technique can be applied for extracting two-dimensional edges, which are difficult to extract only by extracting of the three-dimensional coordinates. In addition, the two-dimensional edges are extracted from within areas of the two-dimensional images corresponding to the planes segmented by the plane labeling unit 17. Therefore, three-dimensional edges that primarily form three-dimensional shapes are removed, and only two-dimensional edges forming figures in the planes are extracted. The two-dimensional edges are identified based on three-dimensional positions of three-dimensional edges in the vicinity of the provisional two-dimensional edge. Therefore, the three-dimensional positions of the two-dimensional edges extracted from the two-dimensional images are evaluated based on the three-dimensional positions of the three-dimensional edges that form the outer edges of the plane.

2. Second Embodiment

A point cloud data processing device provided with a three-dimensional laser scanner will be described hereinafter. The same components as in the First Embodiment are indicated by the same reference numerals as in the case of the First Embodiment, and descriptions therefor are omitted in the following.

Structure of Point Cloud Data Processing Device

The point cloud data processing device rotationally emits distance measuring light (laser light) to an object and measures a distance to a target point on the object therefrom based on flight time of the laser light. Then, the point cloud data processing device measures the emitted direction (horizontal angle and elevation) of the laser light and calculates three-dimensional coordinates of the target point based on the distance and the emitted direction. The point cloud data processing device takes two-dimensional images (RGB intensity of each target point) that are photographs of the object and forms point cloud data by linking the two-dimensional images and the three-dimensional coordinates. Next, the point cloud data processing device generates three-dimensional polylines formed of three-dimensional edges and two-dimensional edges from the formed point cloud data.

Figure 25:
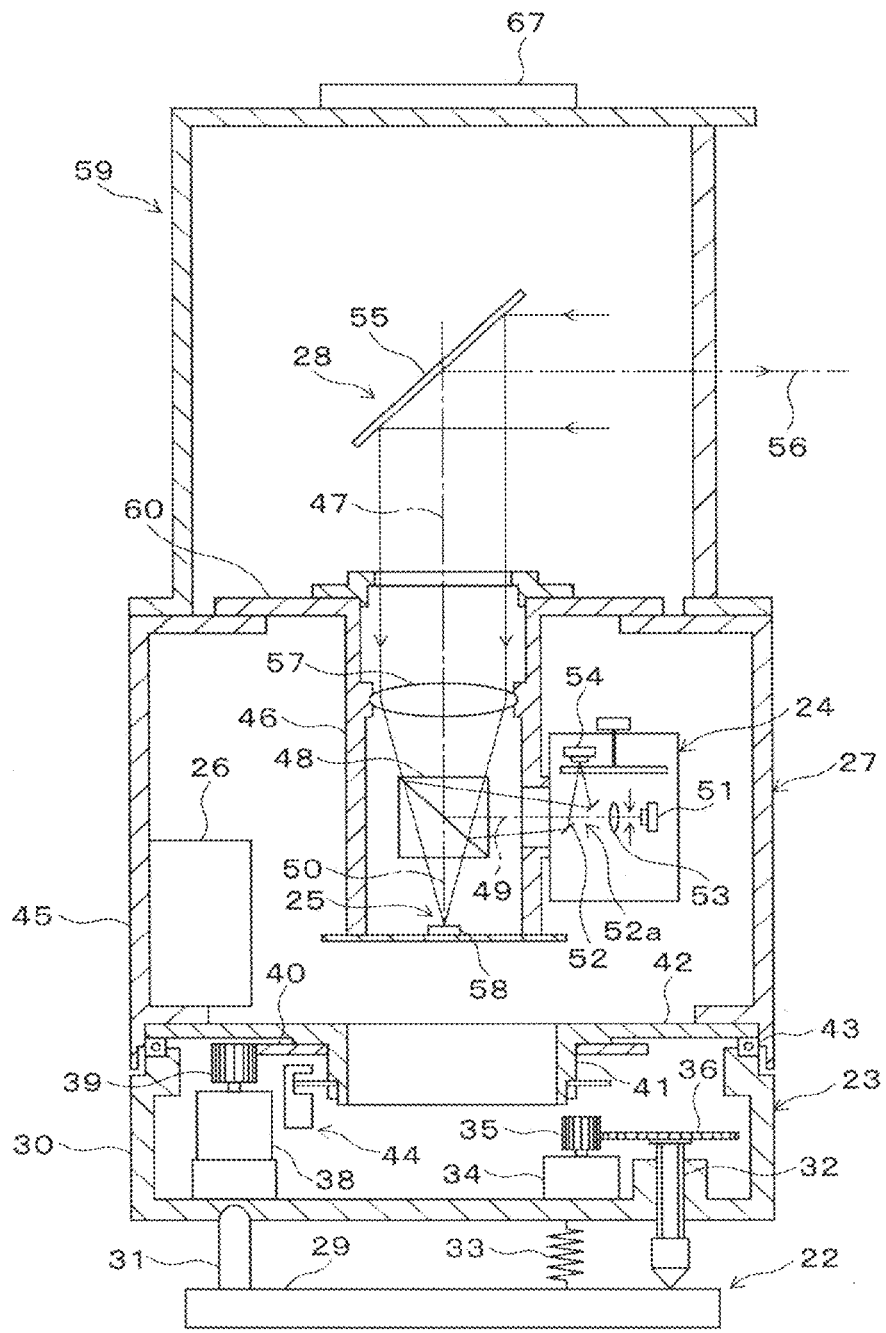
FIG. 25 is a cross section for showing a structure of a point cloud data processing device.
Figure 26:
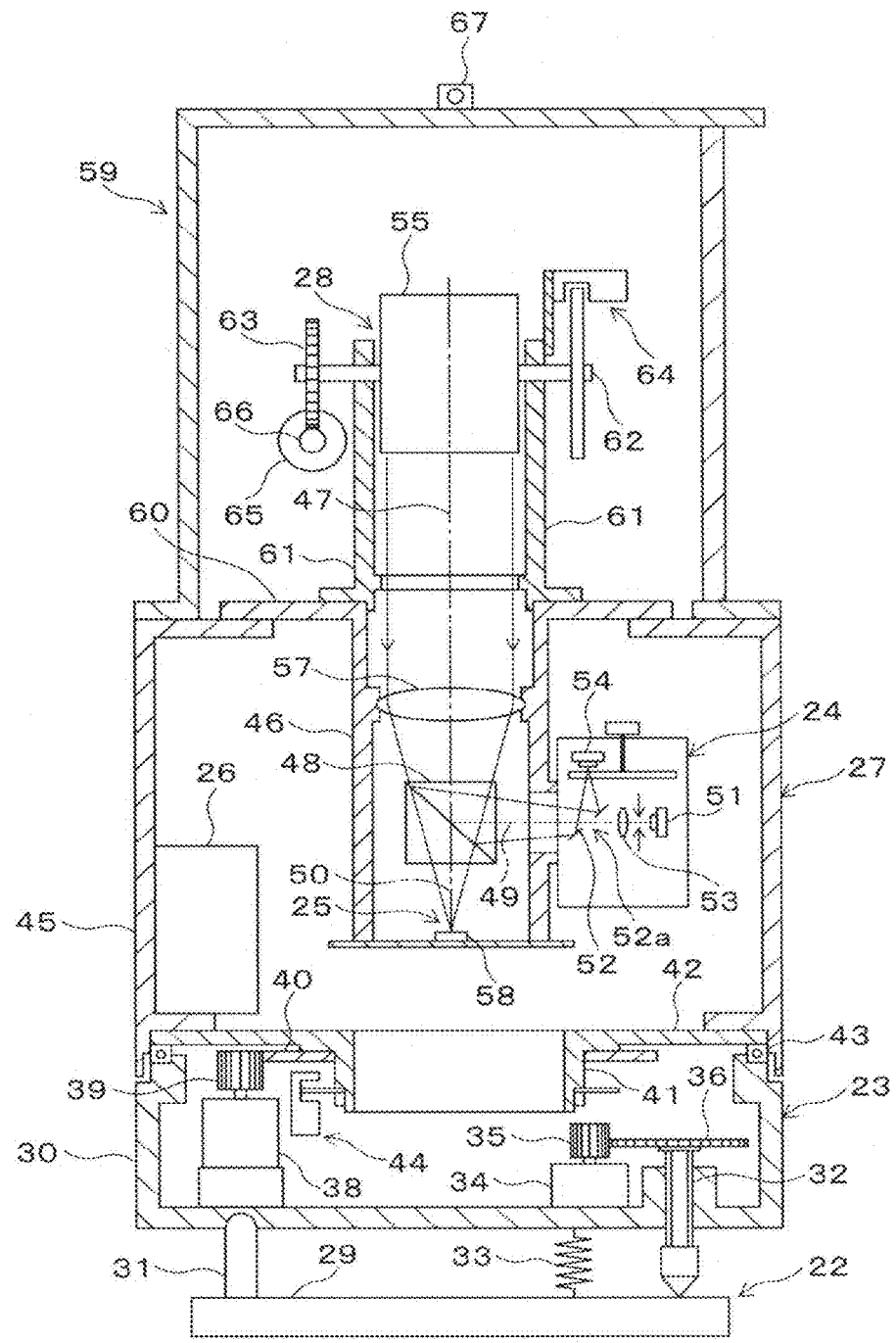
FIG. 26 is a cross section for showing a structure of a point cloud data processing device.

FIGS. 25 and 26 are cross sections showing a structure of the point cloud data processing device. The point cloud data processing device 1 includes a level unit 22, a rotational mechanism 23, a main body 27, and a rotationally-emitting unit 28. The main body 27 is formed of a distance measuring unit 24, an imaging unit 25, and a controlling unit 26, etc. For convenience of description, FIG. 26 shows the point cloud data processing device 1 in which only the rotationally-emitting unit 28 is viewed from a side direction with respect to the cross-section direction shown in FIG. 25.

The level unit 22 has a base plate 29 and a lower casing 30. The lower casing 30 is supported by the base plate 29 with three points of a pin 31 and two adjusting screws 32. The lower casing 30 is tiltable on a fulcrum of a head of the pin 31. An extension spring 33 is provided between the base plate 29 and the lower casing 30 so that they are not separated from each other.

Two level motors 34 are provided inside the lower casing 30. The two level motors 34 are driven independently of each other by the controlling unit 26. By driving the level motors 34, the adjusting screws 32 rotate via a level driving gear 35 and a level driven gear 36, and the downwardly-protruded amounts of the adjusting screws 32 are adjusted. Moreover, a tilt sensor 37 (see FIG. 27) is provided inside the lower casing 30. The two level motors 34 are driven by detection signals of the tilt sensor 37, whereby leveling is performed.

The rotational mechanism 23 has a horizontal rotation driving motor 38 inside the lower casing 30. The horizontal rotation driving motor 38 has an output shaft into which a horizontal rotation driving gear 39 is fitted. The horizontal rotation driving gear 39 is engaged with a horizontal rotation gear 40. The horizontal rotation gear 40 is provided to a rotating shaft portion 41. The rotating shaft portion 41 is provided at the center portion of a rotating base 42. The rotating base 42 is provided on the lower casing 30 via a bearing 43.

The rotating shaft portion 41 is provided with, for example, an encoder, as a horizontal angle sensor 44. The horizontal angle sensor 44 measures a relative rotational angle (horizontal angle) of the rotating shaft portion 41 with respect to the lower casing 30. The horizontal angle is input to the controlling unit 26, and the controlling unit 26 controls the horizontal rotation driving motor 38 based on the measured results.

The main body 27 has a main body casing 45. The main body casing 45 is securely fixed to the rotating base 42. A lens tube 46 is provided inside the main body casing 45. The lens tube 46 has a rotation center that is concentric with the rotation center of the main body casing 45. The rotation center of the lens tube 46 corresponds to an optical axis 47. A beam splitter 48 as a means for splitting light flux is provided inside the lens tube 46. The beam splitter 48 transmits visible light and reflects infrared light. The optical axis 47 is split into an optical axis 49 and an optical axis 50 by the beam splitter 48.

The distance measuring unit 24 is provided to the outer peripheral portion of the lens tube 46. The distance measuring unit 24 has a pulse laser light source 51 as a light emitting portion. The pulse laser light source 51 and the beam splitter 48 are provided with a perforated mirror 52 and a beam waist changing optical system 53 therebetween. The beam waist changing optical system 53 changes beam waist diameter of the laser light. The pulse laser light source 51, the beam waist changing optical system 53, and the perforated mirror 52, form a distance measuring light source unit. The perforated mirror 52 introduces the pulse laser light from a hole 52a to the beam splitter 48 and reflects laser light, which is reflected at the object and returns, to a distance measuring-light receiver 54.

The pulse laser light source 51 is controlled by the controlling unit 26 and emits infrared pulse laser light at a predetermined timing accordingly. The infrared pulse laser light is reflected to an elevation adjusting rotating mirror 55 by the beam splitter 48. The elevation adjusting rotating mirror 55 reflects the infrared pulse laser light to the object. The elevation adjusting rotating mirror 55 turns in the elevation direction and thereby converts the optical axis 47 extending in the vertical direction into a floodlight axis 56 in the elevation direction. A focusing lens 57 is arranged between the beam splitter 48 and the elevation adjusting rotating mirror 55 and inside the lens tube 46.

The laser light reflected at the object is guided to the distance measuring-light receiver 54 via the elevation adjusting rotating mirror 55, the focusing lens 57, the beam splitter 48, and the perforated mirror 52. In addition, reference light is also guided to the distance measuring-light receiver 54 through an inner reference light path. Based on time until the laser light is reflected and is received at the distance measuring-light receiver 54, and on time until the laser light is received at the distance measuring-light receiver 54 through the inner reference light path, a distance from the point cloud data processing device 1 and the object is measured.

The imaging unit 25 has an image sensor 58 that is provided at the bottom of the lens tube 46. The image sensor 58 is formed of a device in which a great number of pixels are flatly assembled and arrayed, for example, a CCD (Charge Coupled Device). The position of each pixel of the image sensor 58 is identified by the optical axis 50. For example, the optical axis 50 may be used as the origin, and an X-Y coordinate is assumed, whereby the pixel is defined as the point of the X-Y coordinate.

The rotationally-emitting unit 28 is contained in a floodlighting casing 59 in which a part of the circumferential wall is made as a floodlighting window. As shown in FIG. 26, the lens tube 46 has a flange portion 60 to which two mirror holding plates 61 are oppositely provided. A rotating shaft 62 is laid between the mirror holding plates 61. The elevation adjusting rotating mirror 55 is fixed to the rotating shaft 62. The rotating shaft 62 has an end into which an elevation gear 63 is fitted. An elevation sensor 64 is provided at the side of the other end of the rotating shaft 62, and measures rotation angle of the elevation adjusting rotating mirror 55 and outputs the measured results to the controlling unit 26.

One of the mirror holding plates 61 is mounted with an elevation adjusting driving motor 65. The elevation adjusting driving motor 65 has an output shaft into which a driving gear 66 is fitted. The driving gear 66 is engaged with an elevation gear 63. The elevation adjusting driving motor 65 is controlled by the controlling unit 26 and is thereby appropriately driven based on the measured results of the elevation sensor 64.

A bead rear sight 67 is provided on the top of the floodlighting casing 59. The bead rear sight 67 is used for approximate collimation with respect to the object. The collimation direction using the bead rear sight 67 is a direction that perpendicularly intersects the extending direction of the floodlight axis 56 and the extending direction of the rotating shaft 62.

Figure 27:
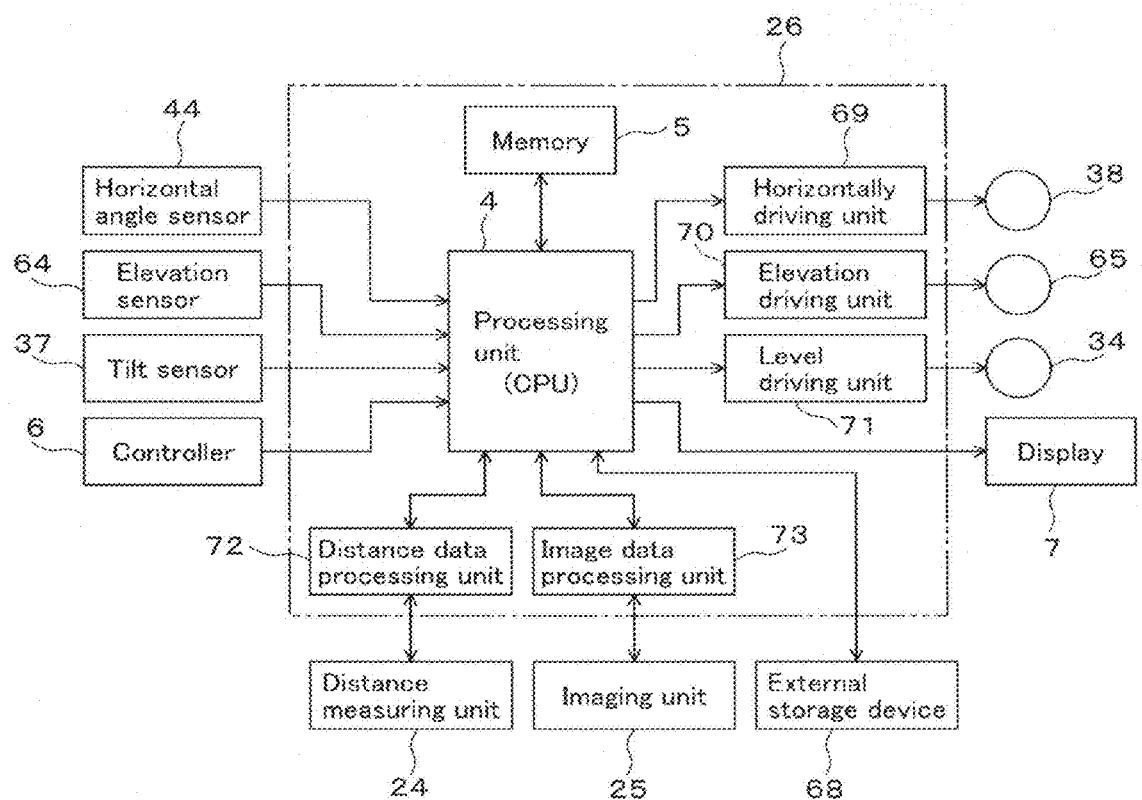
FIG. 27 is a block diagram of a controlling unit.

FIG. 27 is a block diagram of a controlling unit. The controlling unit 26 inputs detection signals from the horizontal angle sensor 44, the elevation sensor 64, and the tilt sensor 37. The controlling unit 26 also inputs instruction signals from the controller 6. The controlling unit 26 drives and controls the horizontal rotation driving motor 38, the elevation adjusting driving motor 65, and the level motor 34, and also controls the display 7 that displays operating conditions and measurement results, etc. The controlling unit 26 is removably provided with an external storage device such as a memory card, a HDD, or the like.

The controlling unit 26 is formed of a processing unit 4, a memory 5, a horizontally driving unit 69, an elevation driving unit 70, a level driving unit 71, a distance data processing unit 72, an image data processing unit 73, etc. The memory 5 stores various programs, an integrating and controlling program for these programs, and various data such as measurement data, image data, and the like. The programs are sequential programs necessary for measuring distances, elevations, and horizontal angles, calculation programs, programs for executing processing of measured data, image processing programs, image display programs for displaying data on the display 7, etc. The horizontally driving unit 69 drives and controls the horizontal rotation driving motor 38. The elevation driving unit 70 drives and controls the elevation adjusting driving motor 65. The level driving unit 71 drives and controls the level motor 34. The distance data processing unit 72 processes distance data obtained by the distance measuring unit 24, and the image data processing unit 73 processes image data obtained by the imaging unit 25.

Figure 28:
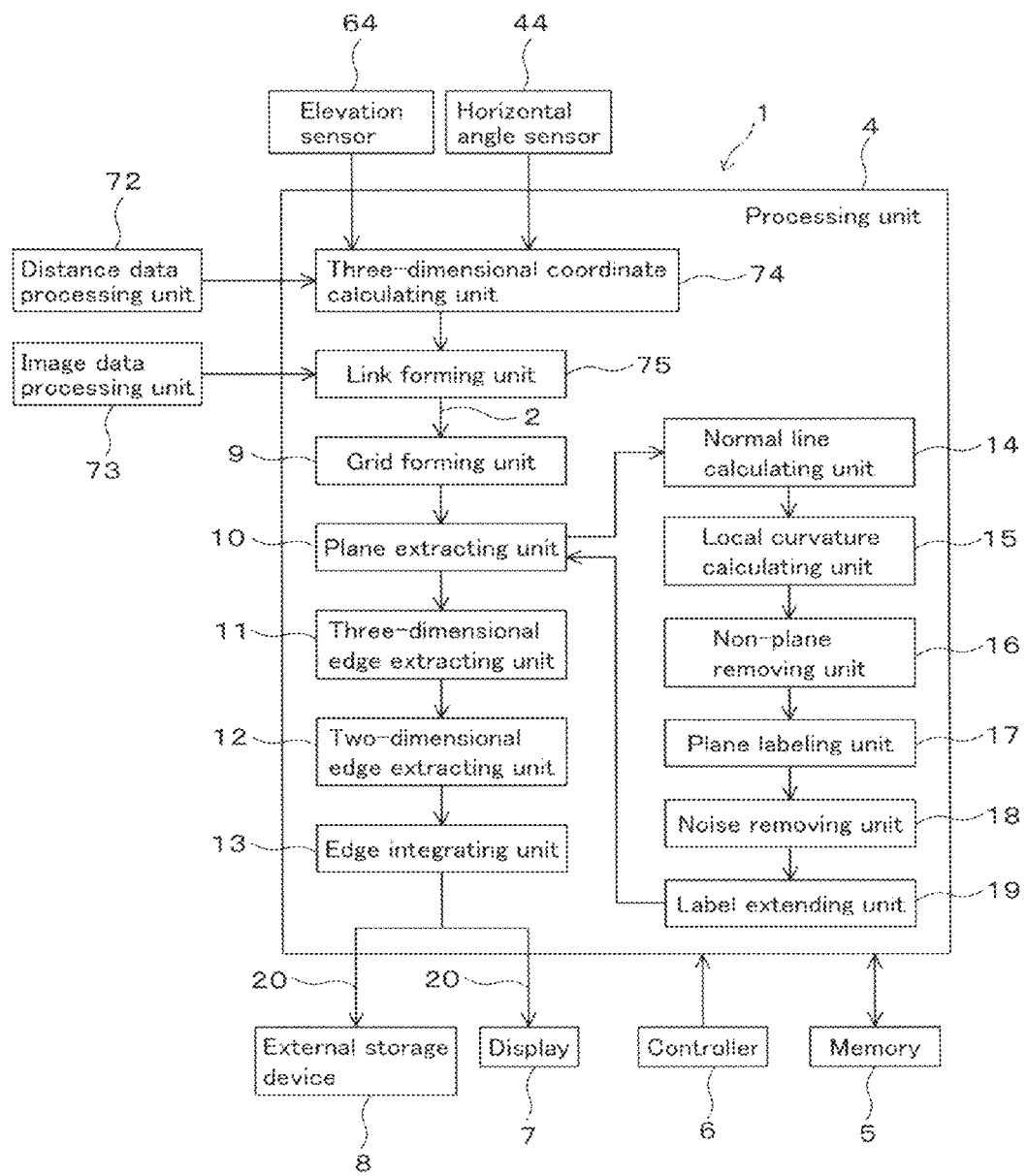
FIG. 28 is a block diagram of a processing unit.

FIG. 28 is a block diagram of the processing unit. The processing unit 4 also has a link forming unit 75 and a grid forming unit 9 besides the components in FIG. 1 described in the First Embodiment. The link forming unit 75 retrieves the distance data from the distance data processing unit 72 and also retrieves direction data (horizontal angle and elevation) from the horizontal angle sensor 44 and the elevation sensor 64. The link forming unit 75 calculates three-dimensional coordinates (orthogonal coordinates) of each target point having the origin (0, 0, 0) at the position of the point cloud data processing device 1, based on the retrieved distance data and the direction data. For example, when a distance is represented as "r", a horizontal angle is represented as $\phi$, an elevation is represented as $\theta$, three-dimensional coordinates (x, y, z) of a target point is obtained by the following Fifth Formula.

$$x = r \sin \theta \cos \phi$$

$$y = r \sin \theta \sin \phi$$

$$z = r \cos \theta \qquad \text{Fifth formula}$$

The link forming unit 75 also retrieves the image data from the image data processing unit 73. The link forming unit 75 forms point cloud data 2 in which image data (RGB intensity of each target point) are linked with the three-dimensional coordinates. The point cloud data processing device 1 can acquire point cloud data 2 of the object that are measured from different directions. Therefore, if one measuring direction is represented as one block, the point cloud data 2 consists of two-dimensional images and three-dimensional coordinates of plural blocks.

Figure 29:
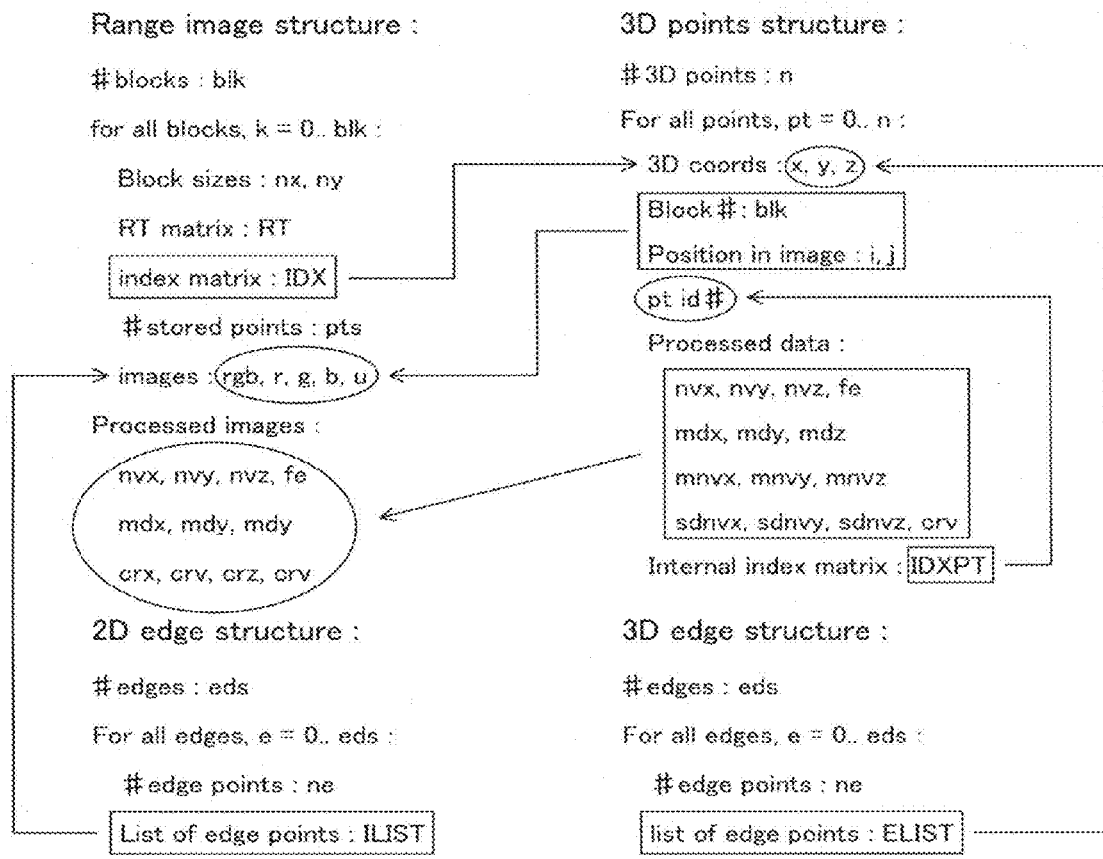
FIG. 29 is a view showing a link structure of three-dimensional coordinates and two-dimensional images of point cloud data.

FIG. 29 is a view showing a link structure of three-dimensional coordinates and two-dimensional images of point cloud data. The figure on the left side in FIG. 29 is a structure of two-dimensional data, and the figure on the right side in FIG. 29 is a structure of three-dimensional data. The two-dimensional data consists of a number of block (blk), block sizes (nx, ny), transformation matrix (RT), index matrix (IDX), stored points (pts), original images (rgb, r, g, b, u), processed images (nvx, nvy, nvz, fe, mdx, mdy, mdz, crx, cry, crz, cry), number of two-dimensional edges (eds), number of points forming the two-dimensional edges (ne), and a list of two-dimensional edge points.

The number of blocks (blk) represents the number of measuring directions, and the block sizes (nx, ny) represent an image size (numbers of horizontal and vertical pixels) in one block. The transformation matrix (RT) represents a transformation matrix of 4×4 that is used for affine transforming point cloud data 2 of a second block and subsequent blocks into a coordinate system of a first block. The index matrix (IDX) is an index that is used for referring to a two-dimensional image of one block for three-dimensional coordinates (x, y, z). The stored points (pts) represent the number of points stored in one block. The original image consists of RGB intensity values (rgb, r, g, b) and brightness (u) thereof.

According to the processing described in the First Embodiment, the processed images are stored in the two-dimensional data. The processed images consist of intensity values of three axes of normal vectors (nvx, nvy, nvz), fitting accuracies to local planes (fe), gray-scale processed (0.255) average values (mdx, mdy, mdz) of the three axes of the normal vectors in local areas, gray-scale processed (0.255) standard deviations (crx, cry, crz) of the three axes of the normal vectors in the local areas, and local curvatures (crv) of the normal vectors in the local areas.

Then, according to the processing of extracting the two-dimensional edges described in the First Embodiment, the number of two-dimensional edges (eds) is stored in the two-dimensional data. Moreover, the number of the points forming the two-dimensional edges (ne), and a list of the two-dimensional edge points (ILIST), are also stored in the two-dimensional data. The RGB intensity values and brightness (rgb, r, g, b, u) of each point can be retrieved from the list of the two-dimensional edge points.

On the other hand, the three-dimensional data consists of a total number of points (n), three-dimensional coordinates (x, y, z), block numbers (blk), positions in an image (i, j), processed data (nvx, nvy, nvz, fe, mdx, mdy, mdz, mnvx, mnvy, mnvz, sdnvx, sdnvy, sdnvz, crv), and internal index matrix (IDXPT).

The total number of points (n) is the total number of points of all blocks; and all points are transformed into three-dimensional coordinates (x, y, z) of the coordinate system of the first block. The RGB intensity values and brightness (rgb, r, g, b, u) of each point can be retrieved from the block number (blk) and the positions (i, j) in the image. The internal index matrix (IDXPT) is an index for retrieving an identifying number of point (ptid).

According to the processing described in the First Embodiment, the processed data are stored in the three-dimensional data. The processed data consists of intensity values of three axes of normal vectors (nvx, nvy, nvz), fitting accuracies to local planes (fe), gray-scale processed (0.255) average values (mdx, mdy, mdz) of the three axes of the normal vectors in local areas, average values (mnvx, mnvy, mnvz) of the three axes of the normal vectors in the local areas, standard deviations (sdnvx, sdnvy, sdnvz) of the three axes of the normal vectors in the local areas, and local curvatures of the normal vectors in the local areas.

Then, according to the processing of extracting the three-dimensional edges described in the First Embodiment, the number of the three-dimensional edges (eds) is stored in the three-dimensional data. Moreover, the number of points forming the three-dimensional edges (ne), and a list of the three-dimensional edge points (ELIST), are also stored in the three-dimensional data. The three-dimensional coordinates (x, y, z) of each point can be retrieved from the list of the three-dimensional edge points (ELIST).

As shown in FIG. 28, the link forming unit 75 outputs the above point cloud data 2 to the grid forming unit 9. The grid forming unit 9 forms a grid (meshes) with equal distances and registers the nearest points on the intersection points of the grid when distances between adjacent points of the point cloud data 2 are not constant. Alternatively, the grid forming unit 9 corrects all points to the intersection points of the grid by using a linear interpolation method or a bicubic method. When the distances between the points of the point cloud data 2 are constant, the processing of the grid forming unit 9 may be skipped.

Figure 30:
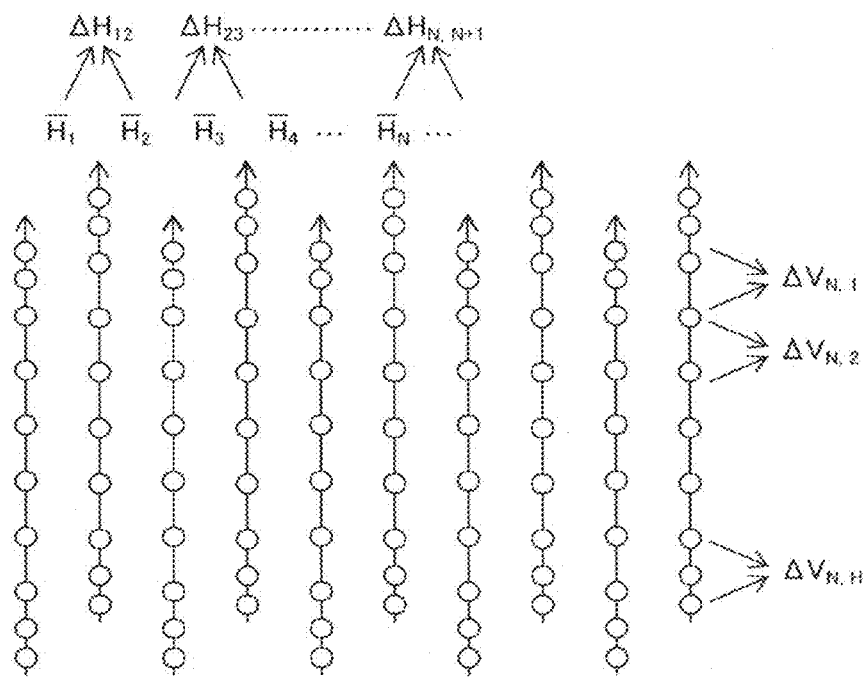
FIG. 30 is a view showing point cloud data in which distances between the points are not constant.
Figure 31:
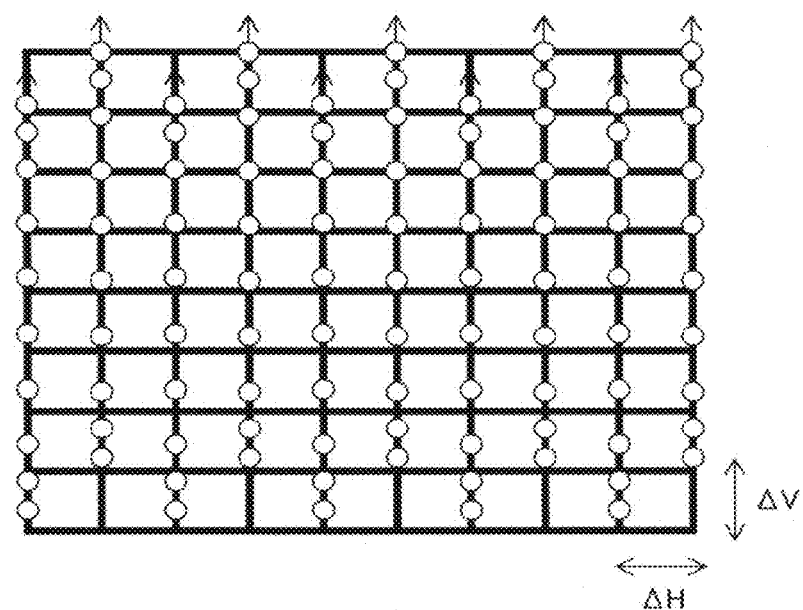
FIG. 31 is a view showing a formed grid.

A processing of forming the grid will be described hereinafter. FIG. 30 shows point cloud data in which distances between the points are not constant, and FIG. 31 shows a formed grid. As shown in FIG. 30, an average horizontal angle $H_{1 \sim N}$ of each line is obtained, and a difference $\Delta H_{i,j}$ of the average horizontal angles between the lines is calculated. Then, the difference $\Delta H_{i,j}$ is averaged and obtained as a horizontal distance $\Delta H$ of the grid (Sixth Formula). In regard to distances in the vertical direction, a distance $\Delta V_{N,H}$ between adjacent points in each line in the vertical direction is calculated. Then, an average of $\Delta V_{N,H}$ in the entire image of a image size W, H is obtained as a vertical distance $\Delta V$ (Seventh Formula). As shown in FIG. 31, a grid with the calculated horizontal distance $\Delta H$ and vertical distance $\Delta V$ is formed.

$$\frac{\sum \Delta H_{i,j}}{N-1} = \Delta H \qquad \text{Sixth Formula}$$

$$\frac{\sum \Delta V_{i,j}}{W*H} = \Delta V \qquad \text{Seventh Formula}$$

Next, the nearest points are registered on the intersection points of the formed grid. In this case, predetermined threshold values are set for distances from each point to the intersection points so as to limit the register of the points. For example, the threshold values may be set to be half of the horizontal distance $\Delta H$ and half of the vertical distance $\Delta V$. As in the case of the linear interpolation method and the bicubic method, all points may be corrected by weighting according to the distances to the intersection points therefrom. In this case, if interpolation is performed, the points are essentially not measured points.

Figure 32:
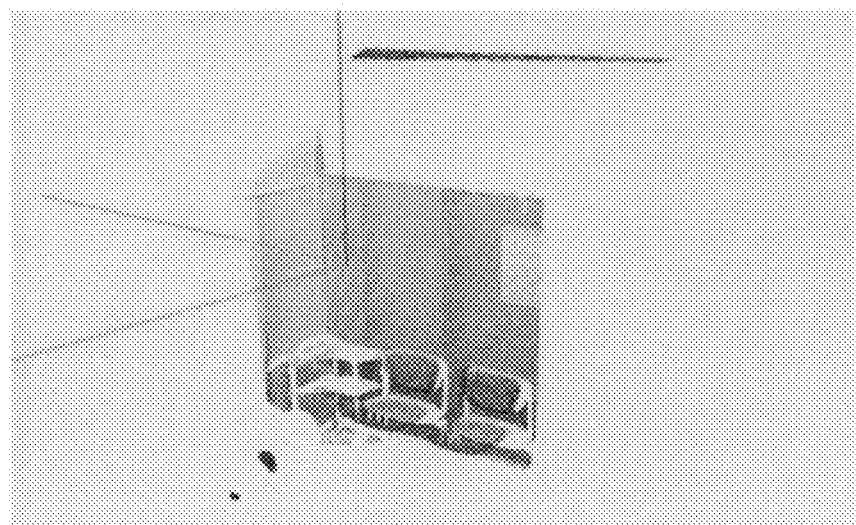
FIG. 32 is a photograph in substitution for a drawing showing point clouds registered on intersection points of a grid in a three-dimensional space.
Figure 33:
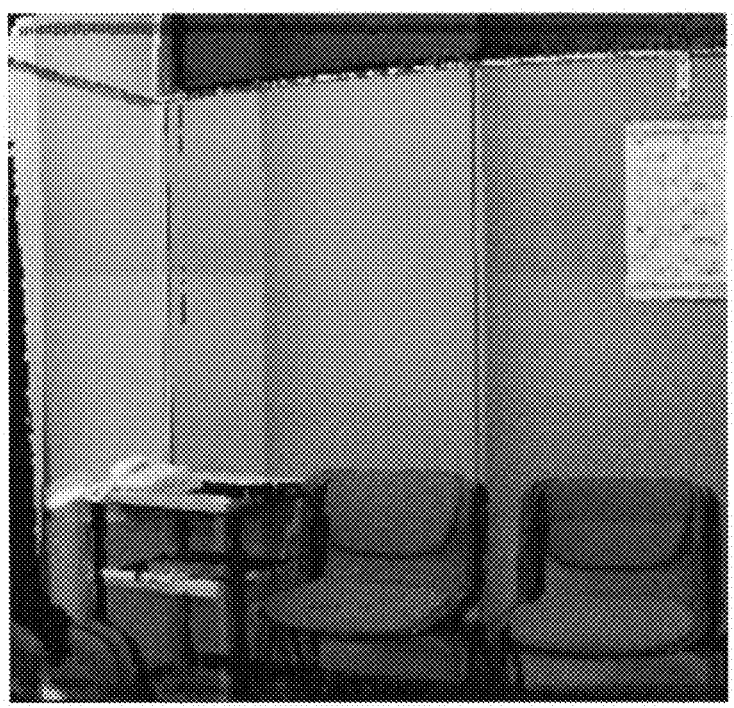
FIG. 33 is a photograph in substitution for a drawing showing point clouds registered on intersection points of a grid in a two-dimensional space.

FIG. 32 is a photograph in substitution for a drawing showing point clouds registered on intersection points of a grid in a three-dimensional space. FIG. 33 is a photograph in substitution for a drawing showing point clouds registered on intersection points of a grid in a two-dimensional space. FIG. 33 shows black pixels which indicate that there is no loss of measured data in point cloud data 2 or there are no vicinity points within limited distances from the intersection points of the grid.

Advantages of the Second Embodiment

Advantages of the Second Embodiment will be described hereinafter. According to the Second Embodiment, point cloud data consisting of two-dimensional images and three-dimensional coordinates is obtained by the three-dimensional laser scanner. The point cloud data are formed by linking two-dimensional images and three-dimensional coordinates. Therefore, three-dimensional edges that form three-dimensional shapes are extracted based on the three-dimensional coordinates. In addition, two-dimensional edges (points and lines of which color densities suddenly change) that form figures within planes are extracted based on the two-dimensional images. Accordingly, while the two-dimensional edges and the three-dimensional edges are simultaneously displayed, extraction and check are performed (FIG. 24).

Moreover, when distances between points of the point cloud data are not constant, a grid with equal distances is formed, and the nearest points are registered on the intersection points of the grid. Accordingly, the distances between the points of the point cloud data are corrected.

3. Third Embodiment

A point cloud data processing device provided with an image measuring unit will be described hereinafter. The same components as in the First and the Second Embodiments are indicated by the same reference numerals as in the case of the First and the Second Embodiments, and descriptions therefor are omitted in the following.

Structure of Point Cloud Data Processing Device

The point cloud data processing device photographs an object from different directions in overlapped photographing areas and matches feature points in the overlapping images. Then, the point cloud data processing device calculates three-dimensional coordinates of the feature points based on position and direction of a photographing unit and positions of the feature points in the overlapping images. The position and direction of the photographing unit are preliminarily calculated. Next, the point cloud data processing device identifies mismatched points based on disparity of the feature points in the overlapping images, the measurement space, and a reference shape, thereby forming point cloud data. The point cloud data includes two-dimensional images and three-dimensional coordinates which are linked together. Moreover, the point cloud data processing device generates three-dimensional polylines consisting of three-dimensional edges and two-dimensional edges from the point cloud data.

Figure 34:
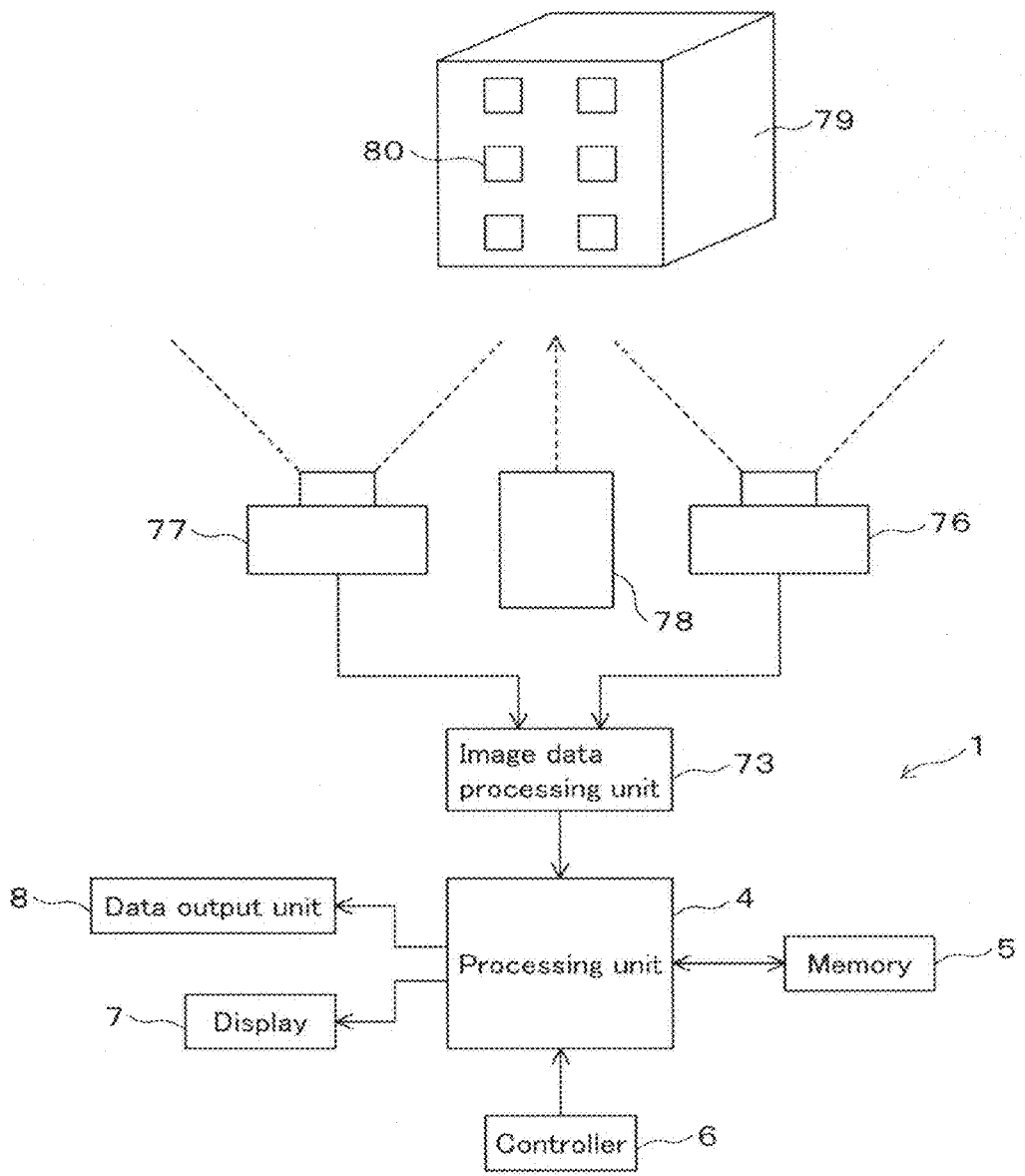
FIG. 34 is a block diagram showing a structure of a point cloud data processing device.

FIG. 34 is a block diagram showing a structure of the point cloud data processing device. The point cloud data processing device 1 is provided with photographing units 76, 77, a feature projector 78, an image data processing unit 73, a processing unit 4, a memory 5, a controller 6, a display 7, and a data output unit 8. The photographing units 76, 77 may be digital cameras, video cameras, CCD cameras (Charge Coupled Device Cameras) for industrial measurement, CMOS cameras (Complementary Metal Oxide Semiconductor Cameras), or the like. The photographing units 76, 77 photograph an object from different photographing positions so as to overlap the photographing area. The number of the photographing units may be one or plural according to the size and the shape of the object.

The feature projector 78 may be a projector, a laser unit, or the like. The feature projector 78 projects random dotted patterns, patterns of point-like spotlight or linear slit light, or the like, to the object. As a result, portions having few features of the object are characterized. This may be used primarily in cases of precise measurement of artificial objects of middle to small size with few patterns. In measurements of relatively large objects normally outdoors, and in cases in which precise measurement is not necessary, or in cases in which the object has features or patterns can be applied to the object, the feature projector 78 may not be used.

The image data processing unit 73 transforms the overlapping images that are photographed by the photographing units 76, 77 into image data so that the proceeding unit 4 can process them. The memory 5 stores various programs and various data such as point cloud data and image data. The programs are programs for measuring photographing position and direction and programs for extracting feature points from the overlapping images and matching them. In addition, the programs include programs for calculating three-dimensional coordinates based on the photographing position and direction and positions of the feature points in the overlapping images. Moreover, the programs include programs for identifying mismatched points and forming point cloud data and programs for extracting planes from the point cloud data and extracting three-dimensional edges and two-dimensional edges. Furthermore, the programs include programs for displaying integrated edges on the display 7.

The controller 6 outputs instruction signals to the processing unit 4. The display 7 displays processed data of the processing unit 4, and the data output unit 8 outputs the processed data of the processing unit 4. The processing unit 4 retrieves the image data from the image data processing unit 73. The processing unit 4 measures the position and the direction of the photographing units 76, 77 based on photographed images of a calibration object 79 when two or more fixed cameras are used. In addition, the processing unit 4 extracts feature points from within the overlapping images of the object and matches them. When one or more unfixed cameras are used, two or more images are photographed, and several matched points (6 or more points) are detected in each image. Then, the processing unit 4 calculates the position and the direction of the photographing units 76, 77. The processing unit 4 calculates three-dimensional coordinates of the object based on the calculated position and direction and the position of the feature points in the overlapping images, thereby forming point cloud data 2. Moreover, the processing unit 4 extracts planes from the point cloud data 2, and then extracts and integrates three-dimensional edges and two-dimensional edges, thereby generating three-dimensional polylines of the object.

Figure 35:
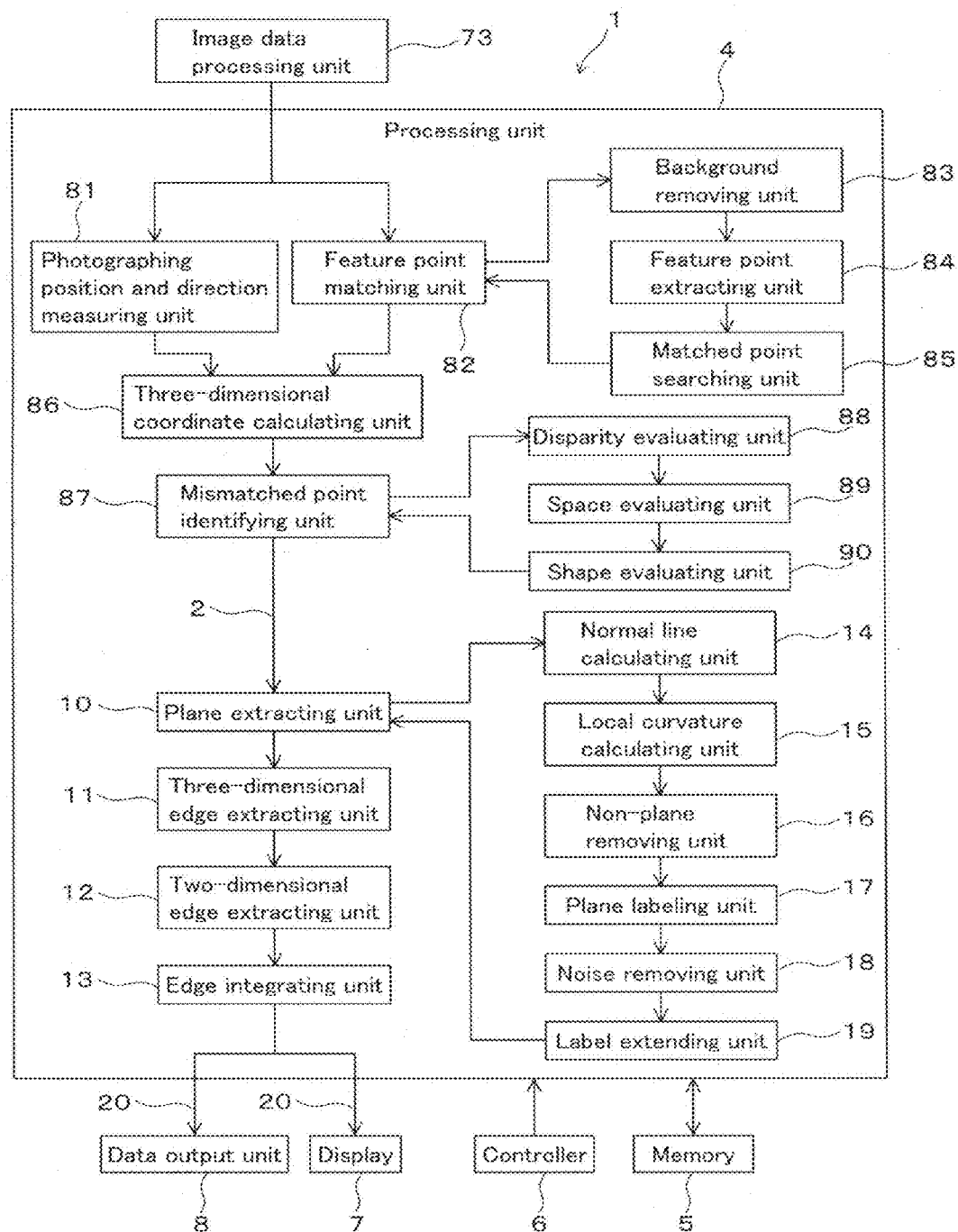
FIG. 35 is a block diagram of a processing unit.

FIG. 35 is a block diagram of the processing unit. The processing unit 4 has the following components in addition to the components shown in FIG. 1. That is, the processing unit 4 also has a photographing position and direction measuring unit 81, a feature point matching unit 82, a background removing unit 83, a feature point extracting unit 84, and a matched point searching unit 85. The processing unit 4 further has a three-dimensional coordinate calculating unit 86, a mismatched point identifying unit 87, a disparity evaluating unit 88, a space evaluating unit 89, and a shape evaluating unit 90.

The photographing position and direction measuring unit 81 retrieves photographed images of the calibration object 79 from the image data processing unit 73 when two or more fixed cameras are used. The calibration object 79 is affixed with targets 80 (retro target, code target, or color code target) at predetermined distances. The photographing position and direction measuring unit 81 detects image coordinates of the targets 80 from the photographed images of the calibration object 79 and measures position and direction of the photographing units 76, 77 by publicly known methods. The method may be a relative orientation method, a single photo orientation or a DLT (Direct Linear Transformation) method, or a bundle adjusting method. The relative orientation method, the single photo orientation or the DLT method, and the bundle adjusting method may be used separately or in combination. When one or more unfixed cameras are used, two or more images are photographed, and several matched points (6 or more points) are detected in each image. Then, the photographing position and direction measuring unit 81 measures the position and the direction of the photographing units 76, 77 by publicly known methods. The method may be a relative orientation method, a single photo orientation or a DLT (Direct Linear Transformation) method, or a bundle adjusting method. The, the relative orientation method, the single photo orientation or the DLT method, and the bundle adjusting method, may be used separately or in combination.

The feature point matching unit 82 retrieves the overlapping images of the object from the image data processing unit 73, and then extracts feature points of the object from the overlapping images and matches them. The feature point matching unit 82 is formed of the background removing unit 83, the feature point extracting unit 84, and the matched point searching unit 85. The background removing unit 83 generates an image with no background, in which only the object is contained. In this case, a background image, in which the object is not contained, is subtracted from the photographed image of the object. Alternatively, target portions are selected by an operator with the controller 6, or target portions are automatically extracted by using models that are preliminarily registered or by automatically detecting portions with abundant features. If it is not necessary to remove the background, the processing of the background removing unit 26 may be skipped.

The feature point extracting unit 84 extracts feature points from the image with no background. In order to extract the feature points, a differentiation filter such as Sobel, Laplacian, Prewitt, and Roberts, is used. The matched point searching unit 85 searches matched points, which correspond to the feature points extracted from one image, in the other image. In order to search the matched points, a template matching method such as a sequential similarity detection algorithm method (SSDA), a normalized correlation method, an orientation code matching (OCM), is used.

The three-dimensional coordinate calculating unit 86 calculates three-dimensional coordinates of each feature point based on the position and the direction of the photographing units 76, 77 that are measured by the photographing position and direction measuring unit 81. This calculation is performed also based on image coordinates of the feature points that are matched by the feature point matching unit 82. The mismatched point identifying unit 87 identifies mismatched points based on at least one of disparity, the measurement space, and a reference shape. The mismatched point identifying unit 87 is formed of the disparity evaluating unit 88, the space evaluating unit 89, and the shape evaluating unit 90.

The disparity evaluating unit 88 forms a histogram of disparity of the feature points matched in the overlapping images. Then, the disparity evaluating unit 88 identifies feature points, of which disparity is without a predetermined range from an average value of the disparity, as mismatched points. For example, an average value±1.5σ (standard deviation) may be set as a threshold value. The space evaluating unit 89 defines a space within a predetermined distance from the center of gravity of the calibration object 79, as a measurement space. In addition, the space evaluating unit 89 identifies feature points as mismatched points when three-dimensional coordinates of the feature points calculated by the three-dimensional coordinate calculating unit 86 are outside the measurement space. The shape evaluating unit 90 forms or retrieves a reference shape (rough planes) of the object from the three-dimensional coordinates of the feature points calculated by the three-dimensional coordinate calculating unit 86. In addition, the shape evaluating unit 90 identifies mismatched points based on distances between the reference shape and the three-dimensional coordinates of the feature points. For example, TIN (Triangulated Irregular Network) with a side of not less than a predetermined length are formed based on the feature points. Then, TIN with a long side is removed, whereby rough planes are formed. Next, mismatched points are identified based on distances between the rough planes and the feature points.

The mismatched points identified by the mismatched point identifying unit 87 are removed, whereby point cloud data 2 is formed. As described in the Second Embodiment, the point cloud data 2 has a directly-linked structure in which the two-dimensional images are linked with the three-dimensional coordinates. When distances between adjacent points of the point cloud data 2 are not constant, as described in the Second Embodiment, the processing unit 4 must have the grid forming unit 9 between the mismatched point identifying unit 87 and the plane extracting unit 10. In this case, the grid forming unit 9 forms a grid (meshes) with equal distances and registers the nearest points on the intersection points of the grid. Then, as described in the First Embodiment, planes are extracted from the point cloud data 2, and three-dimensional edges and two-dimensional edges are extracted and integrated.

Advantages of the Third Embodiment

Advantages of the Third Embodiment will be described hereinafter. According to the Third Embodiment, point cloud data consisting of two-dimensional images and three-dimensional coordinates are obtained by the image measuring unit.

4. Fourth Embodiment

A modification example of the method for extracting three-dimensional edges will be described hereinafter. The modification example is another example of the method for extracting three-dimensional shapes of an object based on labeled planes. The same components as in the First to the Third Embodiments are indicated by the same reference numerals as in the case of the First to the Third Embodiments, and descriptions therefor are omitted in the following.

Figure 36A:
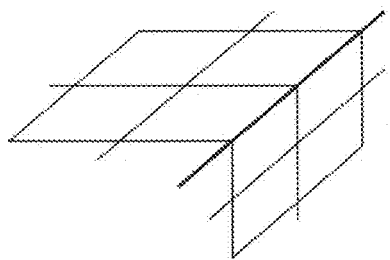
FIG. 36A shows a sharp three-dimensional edge of a straight line.
Figure 36B:
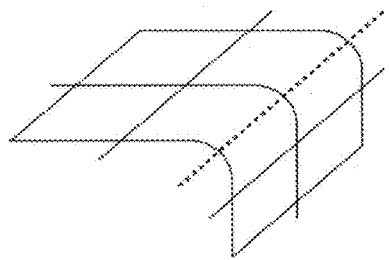
FIG. 36B shows a smooth three-dimensional edge of a straight line.
Figure 36C:
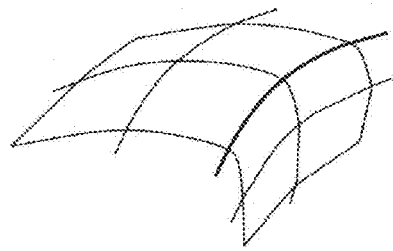
FIG. 36C shows a sharp three-dimensional edge of a curved line.
Figure 36D:
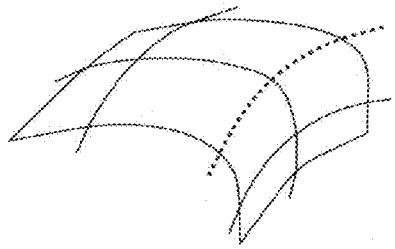
FIG. 36D shows a smooth three-dimensional edge of a curved line.
Figure 37:
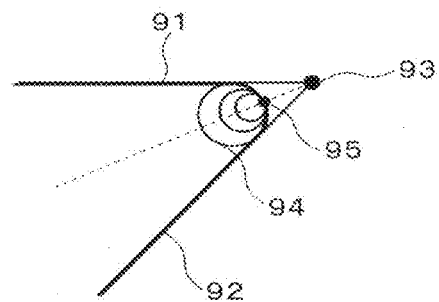
FIG. 37 is a cross section of a smooth three-dimensional edge.

FIG. 36A shows a sharp three-dimensional edge of a straight line, FIG. 36B is a smooth three-dimensional edge of a straight line, FIG. 36C shows a sharp three-dimensional edge of a curved line, and FIG. 36D shows a smooth three-dimensional edge of a curved line. FIG. 37 is a cross section of a smooth three-dimensional edge.

FIGS. 36A and 36C show sharp three-dimensional edges by solid lines. As described in the three-dimensional edge extracting step 9 in FIG. 1, the sharp three-dimensional edges are extracted as lines of intersections of planes (lines of intersection of a pair of a flat plane and a flat plane, a pair of a flat plane and a curved plane, and a pair of a curved plane and a curved plane). On the other hand, FIGS. 36B and 36D show smooth three-dimensional edges by dotted lines. As shown in FIG. 37, each of the smooth three-dimensional edges is a virtual three-dimensional edge 93 of a line of intersection of planes 91 and 92 that are extracted in the plane extracting step S10 in FIG. 1. Alternatively, an equation for a column 94, which contacts the planes 91 and 92 and has points off the planes 91 and 92, may be calculated, and an actual three-dimensional edge 95 may be obtained based on the radius of the column 94.

Advantages of the Fourth Embodiment

Advantages of the Fourth Embodiment will be described hereinafter. According to the Fourth Embodiment, three-dimensional edges are extracted at superior accuracy according to the kind of the three-dimensional edges.

INDUSTRIAL APPLICABILITY

The present invention can be used for techniques of generating data of three-dimensional shapes of objects from point cloud data thereof.

The invention claimed is:

1. A point cloud data processing device comprising:
a first circuit having a structure that selects a square area as a local area,
obtains variation of normal vectors at each point in the square area, obtains fitting accuracy of the square area with respect to a local plane, obtains coplanarity of a target point and an adjacent point in the square area, removes points in a non-plane area when the square area is judged to be the non-plane area, and constructs a non-plane, which is not a flat plane and not a curved plane, based on the variation of the normal vectors, the fitting accuracy, and the coplanarity wherein such constructing of the non-plane involves removing all points of an area in which three dimensional edges of an object in the local areas exist based on each of the following processes performed by the first circuit: 1) variation of normal vectors at each point in each of the selected local areas so as to identify and remove points of those selected areas having a local curvature greater than a first predetermined threshold, 2) fitting accuracy of a local plane in each of the selected local areas, and 3) checking coplanarity in a target point in one of the selected local areas and a surrounding point in one of the remaining selected local areas by removing the target point when the largest value of a) an inner product of a first normal vector of the selected local area containing the target point and a vector connecting the target point and a point where a second normal vector intersects the selected local area of the surrounding point and b) an inner product of the second normal vector and the vector connecting the target point and the
point where the second normal vector intersects the selected local area of the surrounding point, is greater than a second predetermined threshold;
and a second circuit having a structure that labels identical labels on points, other than the removed points, in a plane.

2. The point cloud data processing device according to claim 1, further comprising:
a third circuit having a structure that counts a total number of each of the points provided with the identical labels and removes the points provided with the identical labels as noise when the total number of the points is not more than a predetermined number.

3. The point cloud data processing device according to claim 1, further comprising:
a third circuit having a structure that provides to a first point, which is not provided with a label, a label that is identical to a label of a second point that is closest to the first point when compared with all points provided with a label.

4. The point cloud data processing device according to claim 1, further comprising:
a third circuit having a structure that calculates distances between each point, which constructs the square area and the local plane, while obtaining the fitting accuracy of the square area with respect to the local plane, wherein the square area is judged to be a non-plane area constructing a non-plane, which is not a flat plane and not a curved plane, when an average of the distances is larger than a predetermined threshold value.

5. A point cloud data processing device for processing point cloud data of an object, the point cloud data including points of plane areas of the object and all points of other areas of the object that do not regard planar areas of the object and include three-dimensional edges of the object, the point cloud data processing device comprising:
a non-plane removing-circuit that removes all points of the other areas of the object from the point cloud data so that the points of the plane areas remain;
a plane labeling circuit in communication with the non-plane removing circuit, wherein the plane labeling circuit adds identical labels to the points of the plane areas that remain and that are in the same planes so as to segment the planes;

a three-dimensional edge calculating-circuit that is in communication with the plane labeling circuit and calculates the three-dimensional edges based on the planes that are segmented; and wherein the non-plane removing circuit selects local areas of the object that are square areas, and wherein the non-plane removing circuit removes all points of an area in which three dimensional edges of the object in the selected local areas exist based on each of the following processes performed by the non-plane removing circuit: 1) variation of normal vectors at each point in each of the selected local areas so as to identify and remove points of those selected areas having a local curvature greater than a first predetermined threshold, 2) fitting accuracy of a local plane in each of the selected local areas, and 3) checking coplanarity in a target point in one of the selected local areas and a surrounding point in one of the remaining selected local areas by removing the target point when the largest value of a) an inner product of a first normal vector of the selected local area containing the target point and a vector connecting the target point and a point where a second normal vector intersects the selected local area of the surrounding point and b) an inner product of the second normal vector and the vector connecting the target point and the point where the second normal vector intersects the selected local area of the surrounding point, is greater than a second predetermined threshold.

6. The point cloud data processing device according to claim 5, wherein the three-dimensional edges form an outer shape of the object.

7. The point cloud data processing device according to claim 5, wherein the three-dimensional edges include: lines of intersections of the planes that are segmented that differ from each other in position and direction, outer edges of the planes that are segmented that differ from each other in position and direction, boundaries between the planes that are segmented that differ from each other in position and direction, or contours dividing the planes that are segmented that are adjacent to each other.

8. The point cloud data processing device according to claim 5, wherein the points of the other areas of the object including the three-dimensional edges are removed based on standard deviations of three axis components of normal vectors of points in local areas.

9. The point cloud data processing device according to claim 8, wherein the local curvature is expressed as follows:

$$\text{LocalCurveture} = \sqrt{\text{Std}NVx^2 + \text{Std}NVy^2 + \text{Std}NVz^2} \qquad \text{Second Formula}$$

where NVx, NVy, and NVz are intensity values of the three axis components of the normal vector of each of the points in the local areas, and StdNVx, StdNVy, and StdNVz are standard deviations of the intensity values NVx, NVy, and NVz, respectively.

10. The point cloud data processing device according to claim 5, wherein the non-plane removing unit only removes points based on a process that does not involve the alteration of a size of a local area.

11. The point cloud data processing device according to claim 5, wherein the non-plane removing circuit selects local areas of the object that are square areas of 3×3, 5×5, or 7×7 pixels.

* * * * *